US012239134B2

(12) United States Patent
Ravishankar et al.

(10) Patent No.: US 12,239,134 B2
(45) Date of Patent: *Mar. 4, 2025

(54) PLANT ANTIMICROBIAL COMPOSITIONS INCLUDING AN EMULSIFIER AND/OR OZONE AND METHODS OF USE

(71) Applicant: Arizona Board of Regents on Behalf of The University of Arizona, Tucson, AZ (US)

(72) Inventors: Sadhana Ravishankar, Tucson, AZ (US); Govindaraj Dev Kumar, Atlanta, GA (US); Libin Zhu, Tucson, AZ (US); Bibiana Law, Tucson, AZ (US)

(73) Assignee: Arizona Board of Regents on Behalf of The University of Arizona, Tucson, AZ (US)

(*) Notice: Subject to any disclaimer, the term of this patent is extended or adjusted under 35 U.S.C. 154(b) by 77 days.

This patent is subject to a terminal disclaimer.

(21) Appl. No.: 17/532,465

(22) Filed: Nov. 22, 2021

(65) Prior Publication Data

US 2022/0079158 A1 Mar. 17, 2022

Related U.S. Application Data

(63) Continuation of application No. 16/704,950, filed on Dec. 5, 2019, now Pat. No. 11,191,275.

(60) Provisional application No. 62/775,724, filed on Dec. 5, 2018.

(51) Int. Cl.
| | | |
|---|---|---|
| A01N 59/00 | (2006.01) | |
| A01N 65/00 | (2009.01) | |
| A01N 65/08 | (2009.01) | |
| A01N 65/22 | (2009.01) | |
| A01N 65/24 | (2009.01) | |
| A01N 65/34 | (2009.01) | |
| A01N 65/36 | (2009.01) | |
| A01N 65/38 | (2009.01) | |
| A01N 65/44 | (2009.01) | |

(52) U.S. Cl.
CPC ............ *A01N 59/00* (2013.01); *A01N 65/00* (2013.01); *A01N 65/08* (2013.01); *A01N 65/22* (2013.01); *A01N 65/24* (2013.01); *A01N 65/34* (2013.01); *A01N 65/36* (2013.01); *A01N 65/38* (2013.01); *A01N 65/44* (2013.01)

(58) Field of Classification Search
CPC ........ A01N 59/00; A01N 65/45; A01N 65/24; A01N 65/22; A01N 65/00; A01N 65/34; A01N 65/38; A01N 65/36; A01N 35/08
See application file for complete search history.

(56) References Cited

U.S. PATENT DOCUMENTS

| | | | | |
|---|---|---|---|---|
| 3,035,968 | A * | 5/1962 | Degoli | ..................... C11D 3/48 426/322 |
| 5,858,443 | A | 1/1999 | Hei et al. | |
| 2003/0064119 | A1 | 4/2003 | Emerson | |
| 2003/0113421 | A1 | 6/2003 | Wilson et al. | |
| 2005/0019269 | A1 | 1/2005 | Marks et al. | |
| 2005/0084470 | A1 | 4/2005 | Abbas | |
| 2007/0264401 | A1 * | 11/2007 | Taormina | .............. A23L 3/3562 426/532 |
| 2011/0059205 | A1 * | 3/2011 | Gaysinsky | ............. A61K 8/498 426/597 |
| 2015/0250224 | A1 | 9/2015 | Castro et al. | |
| 2015/0342854 | A1 | 12/2015 | Shibuya et al. | |

FOREIGN PATENT DOCUMENTS

| | | |
|---|---|---|
| WO | WO 2003/009694 | 2/2003 |
| WO | WO 2015/088306 | 6/2015 |
| WO | WO 2015/088307 | 6/2015 |
| WO | WO 2015/088308 | 6/2015 |
| WO | WO 2015/088309 | 6/2015 |

OTHER PUBLICATIONS

Dev Kumar et al., "Effect of ozone and ultraviolet light on *Listeria monocytogenes* populations in fresh and spent chill brines," *Food Control*, vol. 59, pp. 172-177, 2016.
Dev Kumar et al., "Ozonized water with plant antimicrobials: An effective method to inactivate *Salmonella enterica* on iceberg lettuce in the produce wash water," *Environ. Res.*, vol. 171, pp. 213-217, 2019 (epublished Nov. 16, 2018).
Doyle, "Food antimicrobials, cleaners, and sanitizers: A review of the literature," *FRI Briefings*, available on the internet at https://pdfs.semanticscholar.org/0f9a/aa9260a4e60170c56da0af29a298c3a7dba2.pdf, 2005 (15 pages).
Friedman et al., "Bactericidal activities of plant essential oils and some of their isolated constituents against *Campylobacter jejuni*, *Escherichia coli*, *Listeria monocytogenes*, and *Salmonella enterica*," vol. 65, pp. 1545-1560, 2002.

(Continued)

*Primary Examiner* — Shirley V Gembeh
(74) *Attorney, Agent, or Firm* — Klarquist Sparkman, LLP

(57) ABSTRACT

Compositions and methods that utilize a combination of essential oils or other plant-derived extracts or compounds and an emulsifier as an antimicrobial are provided. In some embodiments the compositions further include ozone. In some embodiments, the composition includes one or more plant essential oils, plant extracts, or plant-derived compounds, or combinations thereof, and an emulsifier (such as a saponin). The antimicrobial composition may also include water, peracetic acid, acetic acid, lactic acid, citric acid, and/or hydrogen peroxide. Methods of killing a microorganism, including contacting the microorganism with the disclosed antimicrobial compositions are also provided. The microorganism may be present on a food item or a food contact of non-food contact surface and may be in the form of a biofilm. In some examples, the antimicrobial composition is used one or more times (such as 1 to 5 times).

17 Claims, 5 Drawing Sheets

(56) References Cited

OTHER PUBLICATIONS

Moore et al., "Antimicrobial activity of apple, hibiscus, olive, and hydrogen peroxide formulations against *Salmonella enterica* on organic leafy greens," *J. Food Prot.*, vol. 74, pp. 1676-1683, 2011.
Moore-Neibel et al., "Antimicrobial activity of lemongrass oil against *Salmonella enterica* on organic leafy greens," *J. Appl. Microbiol.* 112:485-492, 2011.
Moore-Neibel et al., "Antimicrobial activity of oregano oil against antibiotic-resistant *Salmonella enterica* on organic leafy greens at varying exposure times and storage temperatures," *Food Microbiol.*, vol. 34, pp. 123-129, 2013.
Olasupo et al., "Activity of natural antimicrobial compounds against *Escherichia coli* and *Salmonella enterica* serovar Typhimurium," *Lett. Appl. Microbiol.*, vol. 36, pp. 448-451, 2003.
Peretto et al. "Increasing strawberry shelf-life with carvacrol and methyl cinnamate antimicrobial vapors released from edible films," *Postharvest Biol. Technol.*, vol. 89, pp. 11-18, 2014.
Perricone et al., "Bioactivity of essential oils: a review on their interaction with food components," *Frontier in Microbiology*, vol. 6, Article 76, 2015 (7 pages).
Reyes-Jurado et al. "Essential oils in vapor phase as antimicrobials: A review," *Crit. Rev. Food Sci.*, doi.org/10.1080/10408398.2019.1586641, 2019 (10 pages).
Selma et al., "Disinfection potential of ozone, ultraviolet-C and their combination in wash water for the fresh-cut vegetable industry," *Food Microbiol.*, vol. 25, pp. 809-814, 2008.
Swamy et al., "Antimicrobial Properties of Plant Essential Oils against Human Pathogens and Their Mode of Action: An Updated Review," *Evidence-Based Complementary and Alternative Medicine*, vol. 2016, Article ID 3012462, 2016 (21 pages).
Todd et al., "The antimicrobial effects of cinnamon leaf oil against multi-drug resistant *Salmonella* Newport on organic leafy greens," *Int. J. Food Microbiol.* 166:193-199, 2013.
Wallace, "Antimicrobial properties of plant secondary metabolites," *Proc. Nutr. Soc.*, vol. 63, pp. 621-629, 2004.

\* cited by examiner

PLANT ANTIMICROBIAL COMPOSITIONS INCLUDING AN EMULSIFIER AND/OR OZONE AND METHODS OF USE

CROSS REFERENCE TO RELATED APPLICATIONS

This application is a continuation of U.S. application Ser. No. 16/704,950, filed Dec. 5, 2019, which claims the benefit of U.S. Provisional Application No. 62/775,724, filed Dec. 5, 2018, each of which are incorporated by reference herein in its entirety.

ACKNOWLEDGMENT OF GOVERNMENT SUPPORT

This invention was made with government support under grant number USDA-NIFA-OREI 2010-51300-21760 awarded by the United States Department of Agriculture-National Institute of Food and Agriculture-Organic Agriculture Research and Extension Initiative and grant number USDA-NIFA 2016-68007-25064 awarded by the United States Department of Agriculture-National Institute of Food and Agriculture. The government has certain rights in the invention.

FIELD

This disclosure relates to antimicrobial compositions and methods, particularly utilizing essential oils, plant extracts, or other plant-derived compounds in combination with emulsifiers and/or ozone.

BACKGROUND

The contamination of fresh produce by foodborne pathogens results in 9.5 million illnesses in the United States each year causing $39 billion in medical losses (Scharff, *J. Food Prot.* 75:123-131, 2012). Transfer of pathogens to produce can happen in the field or during post-harvest washing (Kumar et al., *Curr. Opin. Food. Sci.* 19:138-144, 2018; Macarisin et al., *Foodborne Pathog. and Dis.* 92(2):160-167, 2012; Perez Rodriguez et al., *Food Microbiol.* 28:694-701, 2011; Ravishankar and Kumar, *Arizona Iceberg Lettuce Research Council Report* 2014). Effectively reducing or eliminating pathogenic microorganisms from wash water during packing and processing is challenging as wash water can contain plant exudates, debris, and organic matter that can reduce the efficacy of oxidative sanitizers such as chlorine (Dev Kumar and Micallef, *Foodborne Pathog. Dis.* 14(5):293-301, 2017; Gil et al., *Int. J. Food. Microbiol.* 134:37-45, 2009). For example, iceberg lettuce can be contaminated by pathogens such as *Salmonella enterica* which may attach to open stomata, fissures in the cuticle or trichome (Benjamin et al., *Int. J. Food. Microbiol.* 165:65-76, 2013; Golberg et al., *Int. J. Food. Microbiol.* 145:250-257, 2011; Takeuchi and Frank, *J. Food. Prot.* 64:147-151, 2001). Post-harvest washing is an important step to reduce contamination by foodborne pathogens on lettuce leaves, since these products are usually consumed raw.

Chlorine is a sanitizer commonly used by the produce industry (Kumar et al., *Microbial Control and Food Preservation*, Springer, pages 199-223, 2017). The efficacy of chlorine decreases with reuse and the byproducts of chlorine can have adverse health effects. Safer and more efficacious alternatives to chlorine are essential because of recurring foodborne outbreaks associated with food products, such as leafy greens.

SUMMARY

Essential oils from herbs and spices have been shown to exhibit antimicrobial properties. Numerous essential oils have shown antimicrobial activity in vitro against different foodborne pathogens such as *Escherichia coli, Campylobacter jejuni, Salmonella enterica*, and *Listeria monocytogenes*. Essential oils fall under the Generally Recognized as Safe (GRAS) status and can be used as sanitizers for the washing of produce without the risk of adverse health effects to the consumer and the environment. Olive extract and other plant-derived compounds, such as oregano oil, have demonstrated antimicrobial activity against *Salmonella* on leafy greens.

Ozone ($O_3$) is an allotrope of oxygen used for the disinfection of bottled water and waste water treatment. Ozone is approved by the United States Food and Drug Administration for use as a disinfectant or sanitizer in the gas or liquid phase on food including meat and poultry and has GRAS status. Ozone is effective against a broad range of Gram-positive and Gram-negative bacteria.

Disclosed herein are compositions and methods that utilize a combination of essential oils or other plant-derived extracts or compounds and an emulsifier as an antimicrobial. In some embodiments the compositions and methods further include ozone. In some embodiments, the composition includes one or more plant essential oils, plant extracts, and/or plant-derived compounds and an emulsifier (such as a saponin). In other examples, the compositions include two or more (such as 2, 3, 4, or more) plant essential oils, plant extracts, and/or plant-derived compounds and an emulsifier. The antimicrobial composition may also include water, peracetic acid, acetic acid, lactic acid, citric acid, and/or hydrogen peroxide. In some examples, the remainder of the composition is water.

In some examples, the composition includes one or more plant essential oils, such as oregano oil, lemongrass oil, cinnamon oil, allspice oil, clovebud oil, mint oil, or a combination of two or more thereof. In other examples, the composition includes one or more plant-derived compounds, such as carvacrol, eugenol, citral, cinnamaldehyde, thymol, or a combination of two or more thereof. The plant essential oil or plant-derived compound may be present in the composition at a concentration of about 0.01-1% (v/v). In other examples, the composition includes a plant extract, such as olive extract, apple extract, grapeseed extract, potato peel extract, melon peel extract, apple peel extract, orange peel extract, hibiscus aqueous extract, green tea, black tea, or decaffeinated black tea extract, mushroom extract, or rice hull smoke extract. The plant extract may be present in the composition at a concentration of about 1-10% (v/v). In some embodiments, the emulsifier is present in the composition at a concentration of about 0.0001-1% (v/v). In some examples, the emulsifier is a saponin (such as Quillaja saponin). In embodiments including ozone, the ozone is present in the composition at a concentration of about 0.1-10 mg/L.

In some embodiments are methods of killing a microorganism, including contacting the microorganism (for example, an item or surface contaminated with the microorganism) with a disclosed antimicrobial composition. In some examples, the microorganism (or an item or surface contaminated with the microorganism) is contacted with the disclosed antimicrobial composition in a solution, as a powder, in a vapor phase, a fog state, or an edible film. The microorganism may be a bacterium (such as *Salmonella enterica, Escherichia coli, Listeria monocytogenes, Staphylococcus aureus, Clostridium perfringens, Vibrio parahaemolyticus, Campylobacter, Shigella*, or Shiga toxin producing *E. coli*), viable but non-culturable bacteria, bacterial spores, helminth, protozoan, fungus, or virus. The microorganism may be present on a food item (such as a produce item or meat item) or a food contact or non-food contact surface (such as a truck, ship, crate, food processing plant, equipment, packaging material, wall, drain, conveyer belt, or floor). In some examples, the microorganism is present on the food item or food contact or non-food contact surface in the form of a biofilm.

In some examples, the antimicrobial composition is used one or more times (such as 1 to 5 times). In embodiments including ozone, ozone may be added to the composition one or more times, or in some examples is added to the composition substantially continuously.

The foregoing and other features of the disclosure will become more apparent from the following detailed description, which proceeds with reference to the accompanying figures.

DETAILED DESCRIPTION

I. Terms

Figure 1:
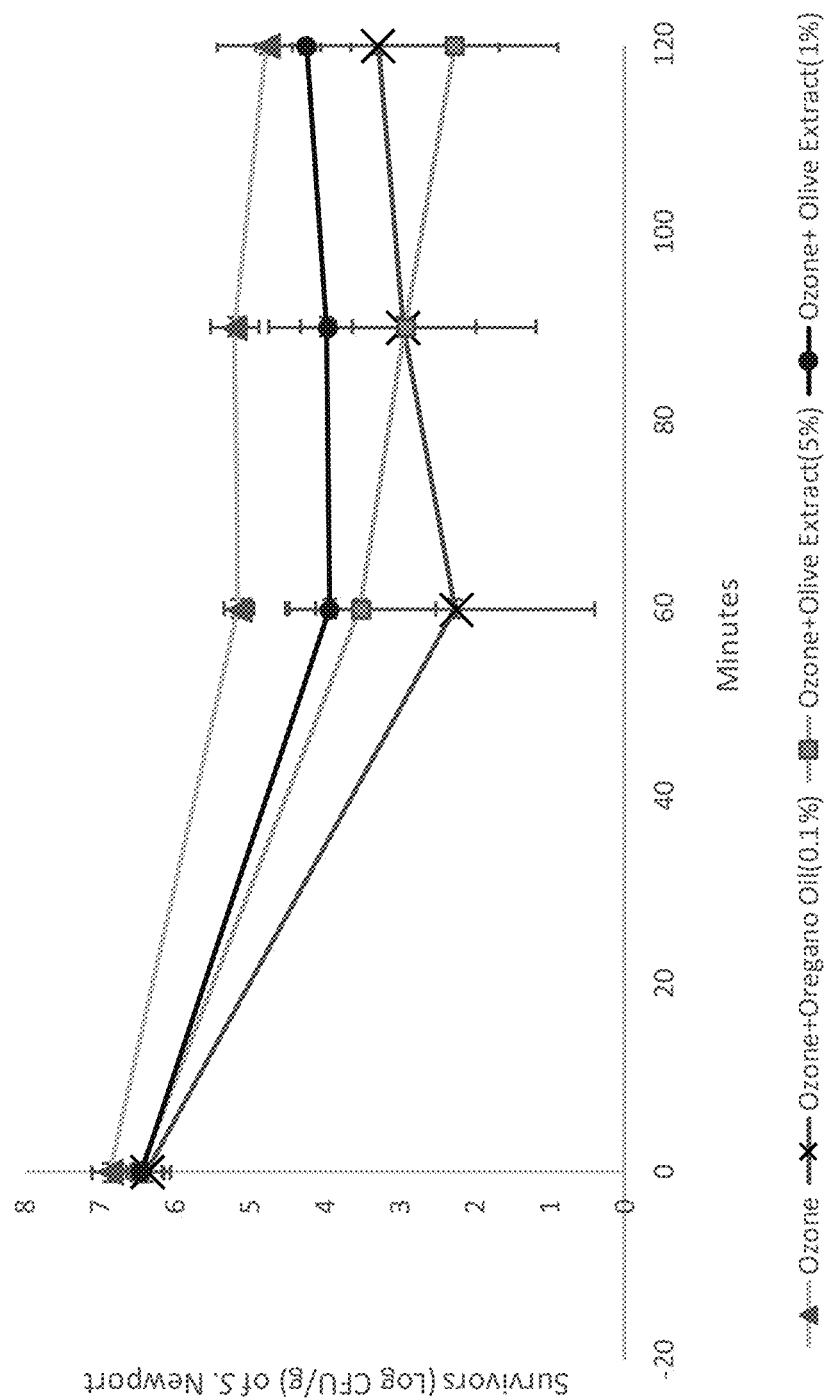
FIG. 1 is a graph showing S. Newport population (log CFU/g) on iceberg lettuce leaves after washing for 60, 90 and 120 min in ozone, ozone+0.1% oregano oil, ozone+1% olive extract, and ozone+5% olive extract.

Unless otherwise noted, technical terms are used according to conventional usage. Definitions of common terms in molecular biology may be found in *Lewin's Genes X*, ed. Krebs et al., Jones and Bartlett Publishers, 2009 (ISBN 0763766321); Kendrew et al. (eds.), *The Encyclopedia of Molecular Biology*, published by Blackwell Publishers, 1994 (ISBN 0632021829); Robert A. Meyers (ed.), *Molecular Biology and Biotechnology: a Comprehensive Desk Reference*, published by Wiley, John & Sons, Inc., 1995 (ISBN 0471186341); and George P. Rédei, *Encyclopedic Dictionary of Genetics, Genomics, Proteomics and Informatics*, 3$^{rd}$ Edition, Springer, 2008 (ISBN: 1402067534), and other similar references.

Unless otherwise explained, all technical and scientific terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Hence "comprising A or B" means including A, or B, or A and B.

Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

In order to facilitate review of the various embodiments of the disclosure, the following explanations of specific terms are provided:

Bacteria: Any of various prokaryotic organisms, including organisms within various phyla in the Kingdom Procaryotae. The terms encompass all microorganisms commonly regarded as bacteria, including *Mycoplasma, Chlamydia, Actinomyces, Streptomyces*, and *Rickettsia*. The term also includes cocci, bacilli, spirochetes, spheroplasts, protoplasts, and so forth. The term bacteria includes Gram-negative and Gram-positive bacteria, as well as viable, but non-culturable bacteria.

Biofilm: An aggregate of microorganisms in which cells that are embedded within a self-produced matrix of extracellular polymeric substances (EPSs) adhere to each other and/or to a surface. The EPS matrix, which is also referred to as slime, is a polymeric conglomeration generally composed of extracellular biopolymers (e.g., polysaccharides and proteins) in various structural forms.

Decontamination: To substantially inactivate or remove unwanted microorganisms or bacterial or fungal spores, for example by killing a substantial number of microorganisms present. In some examples, decontamination with the disclosed antimicrobial compositions kills at least 25%, at least 50%, at least 75%, at least 80%, at least 90%, at least 95%, at least 99%, at least 99.9%, at least 99.99%, or at least 99.999% of microorganisms present following contact with the composition. For example, decontamination with the disclosed antimicrobial compositions reduces the number of microorganisms (such as bacteria) present by at least 1-log, at least 2-logs, at least 3-logs, at least 4-logs, at least 5-logs, or more (for example as compared to no treatment).

Emulsifier: A compound or combination of compounds that increases or maintains suspension or dispersion of one liquid in another, for example a mixture of an oil and water. Exemplary emulsifiers include saponins, algin, carrageenan, agar, gum arabic, and lecithins. In some examples, emulsifiers also have surfactant and/or detergent-like properties.

Microorganism: Any of various bacteria, viruses, fungi, and protozoa that can cause disease or death to humans, animals, or plants, or other biological organisms.

Pathogenic spores are spores that are produced from a pathogen. Particular examples of pathogens that can produce spores include, but are not limited to, members of the genera *Bacillus, Clostridium, Desulfotomaculans, Sporolactobacillus, Sporosarcina*, and pathogenic fungi. In some examples the spore is referred to as an oocyst, such as those produced by members of the Phylum *Apicomplexa* (such as *Plasmodium falciparum* and *Cryptosporidium parvum*).

II. Antimicrobial Compositions

Provided herein are antimicrobial compositions. In some embodiments, the disclosed compositions include one or more essential oils, plant extracts, and/or plant-derived compounds and one or more emulsifiers. In some examples, the compositions include two or more plant essential oils, plant extracts, and/or plant-derived compounds (such as 2, 3, 4, or more; e.g., two or more essential oils) and one or more emulsifiers. In other embodiments, the disclosed compositions include one or more essential oils, plant extracts, and/or plant-derived compounds, one or more emulsifiers, and ozone. In other examples, the compositions include two or more plant essential oils, plant extracts, and/or plant-derived compounds (such as 2, 3, 4, or more; e.g., two or more essential oils), one or more emulsifiers, and ozone. In further embodiments, the compositions include one or more essential oils or plant-derived compounds and ozone. Exemplary antimicrobial compositions include those provided in Table 1. In some examples, the remainder of the composition is water or another liquid. In other examples, the composition further includes one or more additional sanitizers, for example, one or more of peracetic acid, acetic acid, lactic acid, citric acid, or hydrogen peroxide.

In some embodiments, the compositions include one or more essential oils (such as 2, 3, 4, or more essential oils) in combination with one or more emulsifiers and optionally ozone. Essential oils include, but are not limited to, oregano oil, cinnamon oil, lemongrass oil, clove (e.g., clovebud) oil, citrus oil, thyme oil, rosemary oil, bay leaf oil, star anise oil, mint oil, patchouli oil, vetiver oil, cardamom oil, sage oil, or allspice oil. In some examples, the essential oil is present in the composition at a concentration of about 0.01-1% (v/v), for example, about 0.01-0.025% (v/v), about 0.25%-0.05% (v/v), about 0.05-0.1% (v/v), about 0.1-0.3% (v/v), about 0.2-0.5% (v/v), about 0.4-0.7% (v/v), about 0.6-0.8% (v/v), or about 0.7-1% (v/v). In other examples, the essential oil is present in the composition at a concentration of at least about 0.01% (v/v), at least about 0.025% (v/v), at least about 0.05% (v/v), at least about 0.1% (v/v), about least about 0.125% (v/v), at least about 0.2% (v/v), at least about 0.25% (v/v), at least about 0.3% (v/v), at least about 0.4% (v/v), at least about 0.5% (v/v), at least about 0.6% (v/v), at least about 0.7% (v/v), at least about 0.8% (v/v), at least about 0.9% (v/v), or at least about 1% (v/v).

In some specific, non-limiting examples, the composition includes 0.01% (v/v), 0.025% (v/v), 0.05% (v/v), 0.1%, (v/v) 0.3% (v/v), 0.5% (v/v), 0.7%, or 1% oregano oil, cinnamon oil, lemongrass oil, or combinations of two or more thereof. In some embodiments, the composition includes a combination of essential oils (such as 2, 3, 4, or more essential oils) and the final concentration of essential oils in the composition is at least about 0.01% (v/v), at least about 0.025% (v/v), at least about 0.05% (v/v), at least about 0.1% (v/v), about least about 0.125% (v/v), at least about 0.2% (v/v), at least about 0.25% (v/v), at least about 0.3% (v/v), at least about 0.4% (v/v), at least about 0.5% (v/v), at least about 0.6% (v/v), at least about 0.7% (v/v), at least about 0.8% (v/v), at least about 0.9% (v/v), or at least about 1% (v/v).

In other embodiments, the compositions include one or more (such as 2, 3, 4, or more) plant-derived compounds in combination with one or more emulsifiers and/or ozone. Exemplary plant-derived compounds include carvacrol, citral, cinnamaldehyde, eugenol, salicylaldehyde, geraniol, isoeugenol, terpineol, perillaldehyde, estragole, thymol, and menthol, or combinations of two or more thereof. In some examples, the plant-derived compound is present in the composition at a concentration of about 0.01-1% (v/v), for example, about 0.01-0.025% (v/v), about 0.25%-0.05% (v/v), about 0.05-0.1% (v/v), about 0.1-0.3% (v/v), about 0.2-0.5% (v/v), about 0.4-0.7% (v/v), about 0.6-0.8% (v/v), or about 0.7-1% (v/v). In other examples, the plant-derived compound is present in the composition at a concentration of at least about 0.01% (v/v), at least about 0.025% (v/v), at least about 0.05% (v/v), at least about 0.1% (v/v), about least about 0.125% (v/v), at least about 0.2% (v/v), at least about 0.25% (v/v), at least about 0.3% (v/v), at least about 0.4% (v/v), at least about 0.5% (v/v), at least about 0.6% (v/v), at least about 0.7% (v/v), at least about 0.8% (v/v), at least about 0.9% (v/v), or at least about 1% (v/v). In some specific, non-limiting examples, the composition includes 0.1%, (v/v) 0.3% (v/v), 0.5%, 0.7%, or 1% (v/v) carvacrol, 0.5%, 0.7%, or 1% citral, or 0.5%, 0.7%, or 1% cinnamaldehyde.

In further embodiments, the compositions include one or more (such as 2, 3, 4, or more) plant extracts in combination with one or more emulsifiers and/or ozone. Exemplary plant extracts include olive extract, apple extract, grapeseed extract, potato peel extract, melon peel extract, orange peel extract, apple peel extract, hibiscus aqueous extract, green tea, black tea, and decaffeinated black tea extracts, mushroom extract, and rice hull smoke extract. Methods of preparing plant extracts are known to one of ordinary skill in the art (see, e.g., *Medicinal Aromatic Plants* 4:196, 2015). In some examples, the plant extract is present in the composition at a concentration of about 1-10% (v/v), for example, about 1-2.5% (v/v), about 2-4% (v/v), about 3-5% (v/v), about 6-8% (v/v), or about 7-10% (v/v). In other examples, the plant extract is present in the composition at a concentration of at least about 1% (v/v), at least about 1.5% (v/v), at least about 2% (v/v), at least about 2.5% (v/v), at least about 3% (v/v), at least about 4% (v/v), at least about 5% (v/v), at least about 6% (v/v), at least about 7% (v/v), at least about 8% (v/v), at least about 9% (v/v), or at least about 10% (v/v). In some specific, non-limiting examples, the composition includes 1%, 5%, or 7% (v/v) olive extract, 5% or 7% apple extract, or 5% or 7% grapeseed extract.

In additional embodiments, the compositions include one or more essential oils, one or more plant-derived compounds, one or more plant extracts, or combinations of two or more thereof and one or more emulsifiers and/or ozone. In some examples, the composition includes one or more essential oils and one or more plant extracts with one or more emulsifiers and/or ozone. One non-limiting example is a composition including oregano oil and olive extract, saponin, and ozone.

In various embodiments, the composition includes an emulsifier. The addition of an emulsifier can promote formation of a stable emulsion, particularly of essential oils, in water, thereby increasing the solubility of the oil in the composition. The emulsifier may also have surfactant and/or detergent properties. Exemplary emulsifiers include saponins, gum arabic, mustard, lecithin (such as soy or egg lecithin), carrageenan, guar gum, mono- and diglycerides, polysorbates, and sodium dodecyl sulfate. In some non-limiting examples, the emulsifier is a saponin. Saponins are plant-derived amphipathic glycosides that have foaming properties when shaken in an aqueous solution. Saponins can be obtained from plants including trees (such as maple (family Aceraceae), horse chestnut (family Hippocastanaceae)), ginseng, *Gynostemma pentaphyllum*, and *Quillaja saponaria*, beans and legumes (such as peas and soybeans), yucca (e.g., *Yucca schidigera*), and plants such as soaproot or soapberry. In some examples, the emulsifier is present in the composition at a concentration of about 0.0001-1% (v/v), for example, about 0.0001-0.0005% (v/v), about 0.0003-0.0007% (v/v), about 0.0004-0.001% (v/v), about 0.001-0.005% (v/v), about 0.002-0.01% (v/v), about 0.01-0.1% (v/v), about 0.05-0.5% (v/v), about 0.25-0.75% (v/v), or about 0.5-1% (v/v). In other examples, the emulsifier is present in the composition at a concentration of at least about 0.0001% (v/v), about least about 0.0002% (v/v), at least about 0.0005% (v/v), at least about 0.0007% (v/v), at least about 0.001% (v/v), at least about 0.003% (v/v), at least about 0.005% (v/v), at least about 0.007% (v/v), at least about 0.01% (v/v), at least about 0.025% (v/v), at least about 0.05% (v/v), at least about 0.1% (v/v), at least about 0.25% (v/v), at least about 0.5% (v/v), at least about 0.75% (v/v), or at least about 1% (v/v). In some specific, non-limiting examples, the composition includes 0.0001% (v/v), 0.002% (v/v), 0.005% (v/v), or 0.01% (v/v) Quillaja saponin.

In various embodiments, the composition also includes ozone. Ozone can be generated using an ozone generator (for example, ForeverOzone™, OG-5G-BB). Ozone can be introduced in a solution such as the compositions disclosed herein using a sparger. In some examples, the composition is around 1-4° C., to increase retention of ozone in the aqueous phase. In some examples, ozone is present in the composition at a concentration of about 0.1-10 mg/L, for example about 0.1-0.25 mg/L, about 0.2-0.5 mg/L, about 0.4-0.8 mg/L, about 0.7-1 mg/L, 1-5 mg/L, 2-6 mg/L, 4-8 mg/L, or about 7-10 mg/L. In other examples, ozone is present in the composition at a concentration of at least about 0.1 mg/L, at least about 0.15 mg/L, at least about 0.2 mg/L, at least about 0.25 mg/L, at least about 0.3 mg/L, at least about 0.4 mg/L, at least about 0.5 mg/L at least about 0.6 mg/L, at least about 0.7 mg/L, at least about 0.8 mg/L, at least about 0.9 mg/L, at least about 1 mg/L, at least about 2 mg/L, at least about 3 mg/L, at least about 4 mg/L, at least about 5 mg/L, at least about 6 mg/L, at least about 7 mg/L, at least about 8 mg/L, at least about 9 mg/L, at least about 10 mg/L. In some specific, non-limiting examples, the composition includes about 0.2 mg/L ozone. In other non-limiting examples, the composition includes about 1-5 mg/L ozone. In other examples, ozone is present in the composition at about 3-8 ppm or about 0.75 ppm (for example, in a dump tank). In some examples, ozone is added to the composition periodically or continuously (for example to compensate for loss of aqueous ozone due to quenching by organic matter, off gassing and relatively short half-life of the ozone molecule).

Non-limiting examples of specific antimicrobial compositions include those shown in Table 1.

TABLE 1

Exemplary antimicrobial compositions

| Essential Oil/Plant compound | Quillaja saponin | Ozone |
| --- | --- | --- |
| 0.3% (v/v) oregano oil | 0.005% (v/v) | |
| 0.1% (v/v) oregano oil | | |
| 0.01% (v/v) lemongrass oil | 0.01% (v/v) | |
| 0.025% (v/v) lemongrass oil | 0.01% (v/v) | |
| 0.05% (v/v) lemongrass oil | 0.01% (v/v) | |
| 0.125% (v/v) lemongrass oil | 0.005% (v/v) | |
| 0.5% (v/v) lemongrass oil | 0.0001% (v/v) | |
| 0.01% (v/v) oregano oil | 0.01% (v/v) | |
| 0.025% (v/v) oregano oil | 0.01% (v/v) | |
| 0.05% (v/v) oregano oil | 0.01% (v/v) | |
| 0.1% (v/v) oregano oil | 0.0001% (v/v) | 1-10 mg/L |
| 0.3% (v/v) oregano oil | 0.0001% (v/v) | 1-10 mg/L |
| 0.5% (v/v) oregano oil | 0.0001% (v/v) | |
| 0.7% (v/v) oregano oil | 0.0001% (v/v) | |
| 0.01% (v/v) cinnamon oil | 0.01% (v/v) | |
| 0.025% (v/v) cinnamon oil | 0.01% (v/v) | |
| 0.05% (v/v) cinnamon oil | 0.01% (v/v) | |

TABLE 1-continued

Exemplary antimicrobial compositions

| Essential Oil/Plant compound | Quillaja saponin | Ozone |
| --- | --- | --- |
| 0.125% (v/v) cinnamon oil | 0.005% (v/v) | |
| 0.5% (v/v) cinnamon oil | 0.0001% (v/v) | |
| 0.1% (v/v) carvacrol | 0.0001% (v/v) | 1-10 mg/L |
| 0.3% (v/v) carvacrol | 0.0001% (v/v) | 1-10 mg/L |
| 0.5% (v/v) carvacrol | 0.0001% (v/v) | 1-10 mg/L |
| 0.7% (v/v) carvacrol | 0.0001% (v/v) | |
| 1% (v/v) carvacrol | 0.0001% (v/v) | |
| 0.5% (v/v) citral | 0.0001% (v/v) | |
| 0.7% (v/v) citral | 0.0001% (v/v) | |
| 1% (v/v) citral | 0.0001% (v/v) | |
| 0.5% (v/v) cinnamaldehyde | 0.0001% (v/v) | |
| 0.7% (v/v) cinnamaldehyde | 0.0001% (v/v) | |
| 1% (v/v) cinnamaldehyde | 0.0001% (v/v) | |
| 1% (v/v) olive extract | 0.0001% (v/v) | 1-10 mg/L |
| 5% (v/v) olive extract | 0.0001% (v/v) | 1-10 mg/L |
| 5% (v/v) olive extract | 0.0001% (v/v) | |
| 7% (v/v) olive extract | 0.0001% (v/v) | |
| 5% (v/v) apple extract | 0.0001% (v/v) | |
| 7% (v/v) apple extract | 0.0001% (v/v) | |
| 5% (v/v) grapeseed extract | 0.0001% (v/v) | |
| 7% (v/v) grapeseed extract | 0.0001% (v/v) | |
| 0.05% (v/v) lemongrass oil + 0.05% (v/v) cinnamon oil | 0.01% (v/v) | |
| 0.05% (v/v) lemongrass oil + 0.05% (v/v) oregano oil | 0.01% (v/v) | |
| 0.05% (v/v) oregano oil + 0.05% (v/v) cinnamon oil | 0.01% (v/v) | |
| 0.05% (v/v) lemongrass oil + 0.05% (v/v) cinnamon oil + 0.05% (v/v) oregano oil | 0.01% (v/v) | |
| 0.025% (v/v) lemongrass oil + 0.025% (v/v) cinnamon oil | 0.01% (v/v) | |
| 0.025% (v/v) lemongrass oil + 0.025% (v/v) oregano oil | 0.01% (v/v) | |
| 0.025% (v/v) oregano oil + 0.025% (v/v) cinnamon oil | 0.01% (v/v) | |
| 0.025% (v/v) lemongrass oil + 0.025% (v/v) cinnamon oil + 0.025% (v/v) oregano oil | 0.01% (v/v) | |
| 0.025% (v/v) lemongrass oil + cinnamon oil (evenly divided) | 0.01% (v/v) | |
| 0.025% (v/v) lemongrass oil + cinnamon oil (evenly divided) | 0.01% (v/v) | |
| 0.025% (v/v) lemongrass oil + oregano oil (evenly divided) | 0.01% (v/v) | |
| 0.025% (v/v) oregano oil + cinnamon oil (evenly divided) | 0.01% (v/v) | |
| 0.025% (v/v) lemongrass oil + cinnamon oil + oregano oil (evenly divided) | 0.01% (v/v) | |

In additional embodiments, the compositions disclosed herein also include one or more additional sanitizing components, such as peracetic acid, acetic acid, lactic acid, or citric acid, or hydrogen peroxide. For example, in some examples, the composition includes about 1-100 ppm peracetic acid, acetic acid, lactic acid, or citric acid, such as about 1-10 ppm, about 5-15 ppm, about 10-20 ppm, about 20-40 ppm, about 25-50 ppm, about 50-75 ppm, or about 75-100 ppm peracetic acid, acetic acid, lactic acid, or citric acid. In other examples, the composition includes about 1 ppm, about 5 ppm, about 10 ppm, about 15 ppm, about 20 ppm, about 25 ppm, about 30 ppm, about 40 ppm, about 50 ppm, about 75 ppm, or about 100 ppm peracetic acid, acetic acid, lactic acid, or citric acid. In other examples, the composition includes about 1-6% hydrogen peroxide, such as about 1-3%, about 2-4%, about 3-5%, or about 4-6% hydrogen peroxide. In other examples, the composition includes about 1%, about 1.5%, about 2%, about 2.5%, about 3%, about 3.5%, about 4%, about 4.5%, about 5%, about 5.5%, or about 6% hydrogen peroxide.

In some examples, the disclosed compositions are included in a solution (such as a wash solution or irrigation water) for decontamination or microbial control on food or other items. However, the compositions can also be included in additional formulations, such as edible food items or edible films. In one example, the composition is included in a salad dressing. In other examples, the composition is included in ready-to-eat food items such as coleslaw, egg salad, chicken salad, potato salad, pasta salad, ready-to-eat meats, and party dips and dipping sauces such as salsas, and guacamole. Dairy products such as raw milk and raw cheeses, seafood products, ground meats, hamburger patties, meat cuts, meat chops, dehydrated food items, soups, pasta, pizza, and canned foods may also include the disclosed compositions.

III. Methods of Use

Methods of using the disclosed compositions as a decontaminant, for example to kill undesired microorganisms or pathogens, are provided herein. The methods include contacting one or more microorganisms with a disclosed antimicrobial composition. The methods can be used to decontaminate an article (such as laboratory equipment, a produce item, or raw meat) or a surface (such as those in a building, house, office, food processing plant, cargo holds on transportation vessels such as airplanes, trucks, trains and ships, crates, counters, cutting boards, equipment, packaging material, wall, drain, conveyer belt, and non-food contact surfaces such as floors and floor drains) that is actually or potentially contaminated with one or more undesired microorganisms. In some examples, the article to be decontaminated is a produce or meat or fish item. In such examples, to decontaminate the article, for example by killing microorganisms present on the surface of the article, the article can be contacted with the composition in the form of a solution, for example by applying the composition to the surface of the article (e.g., by pouring, spraying, or misting the composition onto the surface, by wiping the surface with a solid substrate including the composition, such as a towel or wipe), by immersing the article in a container containing the composition, or rinsing the article with the composition. In other examples, the article is contacted with a vapor phase containing the composition (for example, in a bag or container during packing). See, e.g., Reyes-Jurado et al. (*Crit. Rev. Food Sci.* doi.org/10.1080/10408398.2019.1586641, 2019), incorporated herein by reference in its entirety). In further examples, the microbial composition may be used as a powder, in the form of an edible film or as a coating on packaging (such as paper packaging). See e.g., Peretto et al. (*Postharvest Biol. Technol.* 89:11-18, 2014); Rodriguez et al. (*Prog. Organic Coatings* 60:33-38, 2007), both of which are incorporated by reference in their entirety.

In particular examples, the antimicrobial composition is used one or more times to decontaminate an article or surface (or batches of articles or surfaces). For example, the antimicrobial composition can be used 1, 2, 3, 4, 5, or more times. In some examples, additional ozone may be added to the composition between uses or substantially continuously during use, to compensate for quenching of ozone during use. In some examples, the additional ozone may also improve the color of the wash water.

In other examples, the disclosed methods include sequentially contacting the article with two or more compositions. In one example, an article is contacted with ozonated water, and then a disclosed composition is subsequently added to the ozonated water and the article is contacted with the wash including the composition and ozone. In an alternative example, an article is contacted with a disclosed composition, and then ozone is added to the composition and the article is contacted with the wash including the antimicrobial, emulsifier, and ozone. In further examples, an article is contacted with a disclosed composition, and the article is subsequently contacted with an ozonated wash.

In one example, the item to be decontaminated is a produce item, such as the surface of a fruit or vegetable, such as tomatoes, leafy greens (such as spring mix, iceberg lettuce, romaine lettuce, baby spinach, mature spinach, kale, arugula, or radicchio), herbs, radishes, onions, scallions, sprouts (such as alfalfa sprouts or mung bean sprouts), cucumbers, apples, grapes, peaches, nectarines, plums, berries, melons (such as cantaloupe or honeydew), celery, leeks, green onions, cilantro, cabbage, cauliflower, broccoli, carrots, and the like. In other examples, the item to be decontaminated is a meat item, such as a piece of raw meat from a cow, pig, or chicken, such as chicken breasts, thighs, wings, or legs, steaks, ground beef, ribs, roasts, and the like. In some examples, the item to be decontaminated is a seafood item, such as a fish or shellfish. In other examples, the item to be decontaminated is a dairy item (such as milk or cheese) or a ready-to-eat food item. Thus, the disclosed compositions can be used to kill adulterants in food products, such as undesired microorganisms.

In other examples, the item to be decontaminated is a food contact and/or non-food contact surface (such as counters, containers, transports, floors, drains, floors, walls, equipment, conveyer belts, packaging, and the like). Exemplary surface materials include but are not limited to stainless steel, plastic (for example, HDPE, PVC, or PC), glass, copper alloys, and rubber (for example, nitrile (BUNA-N) rubber).

In some examples, the method can further include rinsing the article or surface after it has been contacted with the antimicrobial composition, for example the surface can be rinsed with water. In a specific example, the article is a produce, meat, or fish product that is rinsed with water after it has been contacted with the antimicrobial composition.

Thus, provided herein are methods of killing a microorganism (e.g., bacterium, bacterial spore, fungal spore, protozoan, or virus), by contacting the microorganism with an antimicrobial composition provided herein. In one example, the bacterium killed is *Escherichia coli* (e.g., *E. coli* O157: H7). In another example, the bacterium killed is *Salmonella enterica* (such as *Salmonella enterica* serovar Newport). In other examples, the bacterium killed is *Listeria monocytogenes*. In some embodiments, the microorganism is present on a food item or surface (such as a food contact and/or non-food contact surface) in the form of a biofilm.

In some examples, the microorganism is killed within 10 minutes, within 15 minutes, within 20 minutes, within 30 minutes, within 60 minutes, within 90 minutes, or within 120 minutes (such as within 10-30 minutes, 20-60 minutes 45-90 minutes, or 90-120 minutes) of contacting it with the antimicrobial composition. In some examples, not all of the microorganisms contacted with the composition are killed, but the composition is still an antimicrobial composition. For example, in some examples at least 25%, at least 50%, at least 75%, at least 80%, at least 90%, at least 95%, at least 99%, at least 99.9%, at least 99.99%, or at least 99.999% of the microorganisms (such as an at least 10-fold, at least 20-fold, at least 30-fold, at least 40-fold, at least 50-fold, or at least 100-fold reduction) are killed within 10 minutes, within 20 minutes, within 30 minutes, within 60 minutes, within 90 minutes, or within 120 minutes (such as within 10-30 minutes, 20-60 minutes 45-90 minutes, or 90-120 minutes) of contacting it with the antimicrobial composition.

In some examples, the method reduces a number of viable microorganisms by at least 1-$\log_{10}$ compared to in the absence of treatment or a control treatment. Thus, in some examples, the method reduces a number of viable microorganisms by at least 1-$\log_{10}$ (such as at least 1-$\log_{10}$, at least 2-$\log_{10}$, at least 3-$\log_{10}$, at least 4-$\log_{10}$, at least 5-$\log_{10}$, at least 6-$\log_{10}$, at least 7-$\log_{10}$, at least 8-$\log_{10}$, or at least 9-$\log_{10}$).

Methods for assaying for pathogen growth or viability are known in the art. Although particular examples are provided herein, the disclosure is not limited to such methods.

Exemplary microorganisms that can be killed using the antimicrobial compositions and methods disclosed herein include bacteria, viruses, protozoa, nematodes, and fungi. In particular embodiments, the compositions and methods can kill bacteria. Exemplary Gram-negative bacteria that can be killed using the antimicrobial compositions provided herein include, but are not limited to: *Escherichia coli* (e.g., K-12, O157:H7, other shiga-toxin producing strains [STEL]), *Salmonella enterica* (including *Salmonella enterica* serovar Newport), *Campylobacter jejuni, Shigella dysenteriae, Legionella pneumophila, Neisseria gonorrhoeae,* and *Vibrio* species (such as *V. cholerae, V. vulnificus, V. parahaemolyticus*). Exemplary Gram-positive bacteria that can be killed using the antimicrobial compositions provided herein include, but are not limited to: *Bacillus anthracis, Staphylococcus aureus* (e.g., methicillin resistant *S. aureus*), *Enterococcus* species (such as vancomycin resistant Enterococci), *Listeria monocytogenes, Clostridium* species (e.g., *Clostridium difficile, Clostridium perfringens*), pneumococcus, gonococcus, and streptococcal meningitis. Exemplary Acid fast bacteria that can be killed using the antimicrobial compositions provided herein include, but are not limited to *Mycobacterium* species (such as *Mycobacterium tuberculosis*, members of the *Mycobacterium avium* complex [MAC]). In one example, the bacteria killed with the disclosed methods is one or more of the following: Group A *Streptococcus*; Group B *Streptococcus; Helicobacter pylori*; Methicillin-resistant *Staphylococcus aureus*; Vancomycin-resistant enterococci; *Clostridium difficile; E. coli* (e.g., Shiga toxin producing strains); *Listeria; Salmonella; Campylobacter; B. anthracis* (such as spores); *Chlamydia trachomatis;* and *Neisseria gonorrhoeae.*

Viruses that can be killed using the disclosed methods include both enveloped and non-enveloped positive-strand RNA viruses and negative-strand RNA viruses. Exemplary positive-strand RNA viruses include, but are not limited to: Picornaviruses (such as Aphthoviridae [for example foot-and-mouth-disease virus (FMDV)]), Cardioviridae; Enteroviridae (such as Coxsackie viruses, Echoviruses, Enteroviruses, and Polioviruses); Rhinoviridae (Rhinoviruses)); Hepataviridae (e.g., Hepatitis A viruses); Hepeviridae (such as Hepatitis E virus); Togaviruses (examples of which include rubella; alphaviruses (such as Western equine encephalitis virus, Eastern equine encephalitis virus, and Venezuelan equine encephalitis virus)); Astroviridae (such as Astroviruses), Flaviviruses (examples of which include Dengue virus, West Nile virus, and Japanese encephalitis virus); Calciviridae (which includes Norovirus and Sapovirus); and Coronaviruses (examples of which include the MERS coronavirus and the SARS coronaviruses, such as the Urbani strain). Exemplary negative-strand RNA viruses include, but are not limited to: Orthomyxoviruses (such as the influenza virus), Rhabdoviruses (such as Rabies virus), and Paramyxoviruses (examples of which include measles virus, respiratory syncytial virus, and parainfluenza viruses).

Viruses also include double-stranded RNA viruses. Double stranded RNA viruses that can be killed using the antimicrobial compositions provided herein include, but are not limited to Reoviridae (such as the Rotaviruses).

Viruses also include DNA viruses. DNA viruses that can be killed using the antimicrobial compositions provided herein include, but are not limited to: Herpesviruses (such as Varicella-zoster virus, for example the Oka strain; cytomegalovirus; and Herpes simplex virus (HSV) types 1 and 2); Hepadnaviridae (such as Hepatitis B virus); Adenoviruses (such as Adenovirus type 1, Adenovirus type 40, and Adenovirus type 41); Poxviruses (such as Vaccinia virus); and Parvoviruses (such as Parvovirus B19).

Another group of viruses includes Retroviruses. Examples of retroviruses that can be killed using the antimicrobial compositions provided herein include, but are not limited to: human immunodeficiency virus type 1 (HIV-1), such as subtype C; HIV-2; equine infectious anemia virus; feline immunodeficiency virus (FIV); feline leukemia viruses (FeLV); simian immunodeficiency virus (SIV); and avian sarcoma virus.

In one example, the virus killed with the disclosed antimicrobial compositions is one or more of the following: HIV (for example an HIV antibody, p24 antigen, or HIV genome); Hepatitis A virus (for example an Hepatitis A antibody, or Hepatitis A viral genome); Hepatitis B (HB) virus (for example an HB core antibody, HB surface antibody, HB surface antigen, or HB viral genome); Hepatitis C (HC) virus (for example an HC antibody, or HC viral genome); Hepatitis D (HD) virus (for example an HD antibody, or HD viral genome); Hepatitis E virus (for example a Hepatitis E antibody, or HE viral genome); a respiratory virus (such as influenza A & B, respiratory syncytial virus, human parainfluenza virus, or human metapneumovirus), or West Nile Virus.

Protozoa, nematodes, and fungi are also types of microorganisms that can be killed using the antimicrobial compositions provided herein. Exemplary protozoa include, but are not limited to, *Plasmodium* (e.g., *Plasmodium falciparum* malaria), *Leishmania, Acanthamoeba, Balmuthia mandrillaris, Giardia, Entamoeba, Cryptosporidium, Isospora, Balantidium, Trichomonas, Trypanosoma* (e.g., *Trypanosoma brucei, Trypanasoma cruzii*), *Naegleria fowleri,* and *Toxoplasma*. Exemplary fungi include, but are not limited to: *Saccharomyces, Candida albicans, Coccidiodes immitis, Stachybotrys chartarum, Blastomyces dermatitidis,* and mildews.

In one example, bacterial spores are killed using the antimicrobial compositions provided herein. For example, the genus of *Bacillus* and *Clostridium* bacteria produce spores that can be killed with the disclosed antimicrobial compositions. Thus, *C. botulinum, C. difficile, C. perfringens, B. cereus,* and *B. anthracis* spores can be killed. In other examples, viable, but non-culturable bacteria are killed.

EXAMPLES

The following examples are provided to illustrate certain particular features and/or embodiments. These examples should not be construed to limit the disclosure to the particular features or embodiments described.

Example 1

Quillaja Saponin for Improving Solubility of Plant Essential Oils in Produce Wash Water

Introduction

The consumption of organic produce has increased in recent years due to health concerns from consumers. The increased demand for fresh produce may raise the risk of foodborne illness outbreaks owing to the consumption of contaminated produce. Better control measures are needed to prevent outbreaks as well as food spoilage, and to increase the shelf-life of fresh produce. Post-harvest treatment with sanitizers is an effective way to reduce pathogenic and background microorganisms. To reduce the costs associated with post-harvest washing, a common practice in the produce industry is to reuse the wash water. In previous lab scale tests, natural antimicrobials and organic sanitizers such as oregano oil and Chico Wash have shown antimicrobial activities against S. Newport on organic leafy greens during recycling. Plant essential oils are insoluble in water due to their hydrophobic properties. Improving their solubility in produce wash water will help enhance the antimicrobial activity. Various materials can be added in the wash water to improve their solubility. Saponins are known for their foaming properties and detergent-like activities which helps improve the solubility of essential oils. Saponins could act as natural detergents resulting in an emulsion of essential oil in water.

The addition of saponins at low concentrations with vigorous agitation helped form a stable emulsion of essential oil in water. The objective of the present study was to investigate the effect of saponin on improving the solubility of oregano oil and lemongrass oil in produce wash water, thereby increasing bacterial reduction on organic baby spinach in a large scale test. The wash water was also recycled five times and the efficacy of the plant antimicrobials investigated.

Materials and Methods

Bacterial strains used: For lab scale testing, S. Newport was used. For large scale testing, non-pathogenic *Escherichia coli* K-12 ATCC 25253 (streptomycin resistant; permitted to be handled in biosafety level 2 labs in large volumes) was used. This strain has been commonly used in the microbiology research field as a surrogate for *E. coli* O157:H7 and *Salmonella*.

Produce and Sanitizer: Organic baby spinach was obtained from a farm in Maricopa, Arizona. For large scale testing the following microemulsions were prepared in the produce wash water and tested: oregano oil (0.3%) combined with quillaja saponin (0.005%), Chico Wash (1:20) combined with saponin (0.005%), and 0.125% lemongrass oil or 0.1% oregano oil. Tap water was used to make the microemulsion solutions and the mixtures were shaken with vigorous agitation. Tap water, 50 ppm chlorine, and 3% hydrogen peroxide were also used as controls. For lab scale testing, 0.3% oregano oil suspended in PBS without saponin was used, and PBS was used as a control.

Sample preparation and inoculation: For lab scale testing, baby spinach samples were rinsed with deionized (DI) water three times. Ten grams of baby spinach were weighed for each sample. Samples were exposed to UV light in a biohood for 30 minutes. Each sample was immersed in 200 mL of $10^6$ CFU/mL *Salmonella* Newport culture for 2 minutes, and dried in a biohood for 30 minutes. Oregano oil (0.9 mL) was added into 300 mL of PBS to make 0.3% solutions. The solutions were stomached for 1 minute to mix well. The solutions were chilled to 10° C. in ice water bath.

For large scale testing, each sample consisted of 5 kilograms of baby spinach. *E. coli* K-12 overnight culture (40 mL) was added into 40 L of Buffered Peptone Water (BPW) to make an inoculum (ca. $10^6$ CFU/mL). Each sample was inoculated by immersion, agitated for 2 minutes and dried in a biohood for 1 hour. Five samples were prepared for each sanitizer test. Positive control samples were taken after the spinach samples were dried in the biohood.

Reuse of natural antimicrobials and sanitizer to reduce bacteria on baby spinach: For lab scale testing, three spinach samples were immersed in the 0.3% oregano oil solution for 2 minutes with gentle agitation. Samples were taken out from the solution and put into stomacher bag and stored at 4° C. The same solutions were used for four more treatments with new spinach samples. The solutions were chilled to 10° C. before each treatment. PBS was used as a control.

For large scale testing, to simulate the commercial scale washing process, a large stainless steel tank (109×51×41 cm) was used for spinach washing. Seventy-five liters of wash water was added into the tank. For the washes with oregano oil or lemongrass oil, the oil was added into the wash water with saponin and agitated vigorously with a snow shovel for 5 minutes. Baby spinach samples (5 kg each) were immersed in the solution and agitated for 2 minutes. The wash water was used five times to treat five different batches of baby spinach samples one after another. After each wash, spinach samples were taken to enumerate the surviving *E. coli* K-12 population. Experiments were also conducted using tap water, 50 ppm chlorine, and 3% hydrogen peroxide treatments using the same protocol. Survivors of *E. coli* K-12 were enumerated on baby spinach and in wash water after each wash.

Enumeration of surviving bacteria on baby spinach: For lab scale testing, spinach samples were taken at day 0, 1, and 3 to enumerate S. Newport survivors on the leaves. BPW (90 mL) was added into the stomacher bag containing 10 g spinach sample, and stomached at normal speed for 1 minute. Serial dilutions were made in 0.1% peptone water and plated on xylose lysine desoxycholate (XLD) agar. The XLD plates were incubated at 37° C. for 24 hours. The colonies on the plates were counted for the enumeration of surviving S. Newport cells.

For large scale testing, after each wash treatment, fifteen spinach samples (25 g each) were weighed and stored in stomacher bags. Five samples among these were plated at day 0. The other ten samples were stored at 4° C. and plated for enumeration on day 1 and day 3 (five samples for each day). For enumeration, 225 ml of BPW was added into the stomacher bag containing 25 g of spinach samples, and stomached at normal speed for 1 minute. Serial dilutions were made in 0.1% peptone water and plated on Eosin-methylene blue (EMB) agar plates with 300 μg/ml of streptomycin. The EMB plates were incubated at 37° C. for 24 hours. The colonies on the plates were counted for the enumeration of surviving *E. coli* K-12 cells.

Results

Survival of S. Newport on spinach after 0.3% oregano oil treatment without saponin: Table 2 shows the surviving S. Newport population on spinach samples after 0.3% oregano oil treatment in the lab scale testing. At day 0, the first wash reduced *Salmonella* population to below detection limit, and the 2nd to 5th washes caused 1.4-2.2 log reductions. At both days 1 and 3, *Salmonella* was not detected on samples from the first washes, and the 2nd to 5th washes caused 1.2-2.4 and 1.4-2.2 log reductions for day 1 and 3, respectively.

TABLE 2

Survival of S. Newport on organic baby spinach (Log CFU/g) after 0.3% oregano oil treatments (without saponin)

|  | Day 0 | Day 1 | Day 3 |
|---|---|---|---|
| 0.3% oregano oil | | | |
| 1st wash | <1.00 ± 0.00 | <1.00 ± 0.00 | <1.00 ± 0.00 |
| 2nd wash | 2.05 ± 0.91 | 1.83 ± 0.75 | 1.86 ± 0.88 |
| 3rd wash | 2.60 ± 0.67 | 2.78 ± 0.23 | 2.77 ± 0.14 |
| 4th wash | 2.84 ± 0.35 | 2.78 ± 0.42 | 2.74 ± 0.36 |
| 5th wash | 2.96 ± 0.56 | 3.16 ± 0.31 | 2.82 ± 0.06 |
| PBS control | | | |
| 1st wash | 4.11 ± 0.06 | 4.40 ± 0.15 | 4.06 ± 0.20 |
| 2nd wash | 4.23 ± 0.02 | 4.25 ± 0.14 | 4.10 ± 0.27 |
| 3rd wash | 4.31 ± 0.21 | 4.29 ± 0.07 | 4.09 ± 0.10 |
| 4th wash | 4.34 ± 0.15 | 4.27 ± 0.18 | 4.20 ± 0.15 |
| 5th wash | 4.34 ± 0.14 | 4.32 ± 0.08 | 4.20 ± 0.36 |

Survival of E. coli K-12 on spinach after 0.3% oregano oil and saponin treatment: Table 3 shows the surviving population on spinach after 0.3% oregano oil and saponin treatment in the large scale testing. At day 0, the 1st and 2nd washes reduced the E. coli population to below detection limit, and the 3rd to 5th washes showed 3.3-1.1 log reductions. At day 1 and 3, the 1st, 2nd and 3rd washes reduced E. coli population to below detection limit. The 4th and 5th washes showed 2.6-1.7 and 4.3-1.2 log reduction at days 1 and 3, respectively.

TABLE 3

Survival of E. coli K-12 on spinach samples (Log CFU/g) after 5 washes in 0.3% oregano oil with 0.005% saponin

| | E.coli K-12 population on spinach | | |
|---|---|---|---|
| Sample | Day 0 | Day 1 | Day 3 |
| Positive | 4.60 ± 0.11 | 5.90 ± 0.11 | 5.67 ± 0.32 |
| 1st wash | <1.00 ± 0.00 | <1.00 ± 0.00 | <1.00 ± 0.00 |
| 2nd wash | <1.00 ± 0.00 | <1.00 ± 0.00 | <1.00 ± 0.00 |
| 3rd wash | 1.34 ± 0.28 | <1.00 ± 0.00 | <1.00 ± 0.00 |
| 4th wash | 2.56 ± 0.26 | 3.25 ± 0.51 | 1.38 ± 0.85 |
| 5th wash | 3.46 ± 0.11 | 4.18 ± 0.11 | 4.45 ± 0.16 |

Data are shown as mean ± SD, n = 5

Survival of E. coli K-12 on spinach after Chico Wash combined with essential oil and saponin treatment: Table 4 shows the surviving population on spinach after pH 2.4 Chico wash combined with 0.125% lemongrass oil and saponin treatment in the large scale testing. At day 0, the 1st wash caused 2 log reductions in E. coli population, and the 2nd to 5th washes showed 1.6-1.1 log reductions. At day 1 and 3, the 1st wash reduced E. coli population to below detection limit. The 2nd to 5th washes showed 1.7-1.4 and 1.8-1.2 log reduction at day 1 and 3, respectively.

TABLE 4

Survival of E. coli K-12 (Log CFU/g) on spinach samples after 5 washes in Chico Wash combined with 0.125% lemongrass oil and 0.005% saponin

|  | Day 0 | Day 1 | Day 3 |
|---|---|---|---|
| Positive control | 4.75 ± 0.10 | 4.63 ± 0.04 | 4.38 ± 0.26 |
| 1st wash | 2.76 ± 0.20 | <1.00 ± 0.00 | <1.00 ± 0.00 |

TABLE 4-continued

Survival of E. coli K-12 (Log CFU/g) on spinach samples after 5 washes in Chico Wash combined with 0.125% lemongrass oil and 0.005% saponin

|  | Day 0 | Day 1 | Day 3 |
|---|---|---|---|
| 2nd wash | 3.20 ± 0.12 | 2.97 ± 0.09 | 2.60 ± 0.28 |
| 3rd wash | 3.39 ± 0.18 | 3.02 ± 0.07 | 2.65 ± 0.23 |
| 4th wash | 3.53 ± 0.07 | 3.14 ± 0.13 | 2.68 ± 0.16 |
| 5th wash | 3.62 ± 0.16 | 3.24 ± 0.10 | 3.20 ± 0.11 |

Data are shown as mean ± SD, n = 5

Table 5 shows the surviving population on spinach after pH 2.4 Chico wash combined with 0.1% oregano oil and saponin treatment in the large scale testing. At day 0, the 1st wash caused 2.1 log reductions in E. coli population, and the 2nd to 5th washes showed 1.5-1.4 log reductions. At day 1 and 3, the 1st wash reduced E. coli population to below detection limit. The 2nd to 5th washes showed 1.8-1.3 and 1.7-1.0 log reduction at day 1 and 3, respectively.

TABLE 5

Survival of E. coli K-12 on spinach samples (Log CFU/g) after 5 washes in pH 2.4 Chico Wash with 0.1% oregano oil and 0.005% saponin

| | E. coli K-12 population on spinach | | |
|---|---|---|---|
| Sample | Day 0 | Day 1 | Day 3 |
| Positive control | 4.95 ± 0.05 | 4.22 ± 0.22 | 4.19 ± 0.20 |
| 1st wash | 2.84 ± 0.09 | <1.00 ± 0.00 | <1.00 ± 0.00 |
| 2nd wash | 3.42 ± 0.10 | 2.47 ± 0.18 | 2.65 ± 0.22 |
| 3rd wash | 3.54 ± 0.06 | 2.73 ± 0.06 | 2.66 ± 0.11 |
| 4th wash | 3.56 ± 0.10 | 2.64 ± 0.22 | 2.53 ± 0.23 |
| 5th wash | 3.56 ± 0.19 | 2.89 ± 0.18 | 3.15 ± 0.19 |

Data are shown as mean ± SD, n = 5

Survival of E. coli K-12 on spinach after re-using tap water, wash water containing 50 ppm chlorine and wash water containing 3% hydrogen peroxide for washing five batches of baby spinach: Tap water, 50 ppm chlorine and 3% hydrogen peroxide are commonly used in organic produce industry, so we included them as controls in this study. The survival of E. coli K-12 on spinach after these treatments in the large scale testing is shown in Tables 6-8. For tap water treatments (Table 6), there were 0.9-1.1 log reductions in E. coli K-12 population at day 0, while only 0.1-1.0 and 0.7-0.8 log reductions were observed at day 1 and 3, respectively.

TABLE 6

Survival of E. coli K-12 on spinach samples (Log CFU/g) after 5 washes in tap water

| | E. coli K-12 population on spinach | | |
|---|---|---|---|
| Sample | Day 0 | Day 1 | Day 3 |
| Positive control | 4.87 ± 0.03 | 4.60 ± 0.08 | 4.33 ± 0.24 |
| 1st wash | 3.87 ± 0.11 | 3.73 ± 0.05 | 3.56 ± 0.08 |
| 2nd wash | 3.92 ± 0.04 | 3.64 ± 0.10 | 3.49 ± 0.10 |
| 3rd wash | 3.85 ± 0.07 | 3.84 ± 0.02 | 3.56 ± 0.04 |
| 4th wash | 3.84 ± 0.44 | 4.46 ± 1.30 | 3.66 ± 0.06 |
| 5th wash | 3.77 ± 0.11 | 3.84 ± 0.05 | 3.63 ± 0.03 |

Data are shown as mean ± SD, n = 5

Table 7 shows the results from 50 ppm chlorine treatment. During 1st to 5th washes with 50 ppm chlorine, 1.1-1.6 log reduction was observed at day 0; 0.7-1.0 and 0.5-0.7 log reductions were observed at day 1 and 3, respectively.

TABLE 7

Survival of *E. coli* K-12 on spinach samples (Log CFU/g) after 5 washes in 50 ppm chlorine

| Sample | E. coli K-12 population on spinach | | |
|---|---|---|---|
| | Day 0 | Day 1 | Day 3 |
| Positive | 4.81 ± 0.10 | 4.26 ± 0.23 | 3.99 ± 0.12 |
| 1st wash | 3.25 ± 0.14 | 3.57 ± 0.04 | 3.30 ± 0.11 |
| 2nd wash | 3.47 ± 0.07 | 3.42 ± 0.11 | 3.40 ± 0.08 |
| 3rd wash | 3.39 ± 0.10 | 3.40 ± 0.13 | 3.28 ± 0.07 |
| 4th wash | 3.57 ± 0.20 | 3.38 ± 0.13 | 3.37 ± 0.06 |
| 5th wash | 3.67 ± 0.11 | 3.29 ± 0.14 | 3.46 ± 0.15 |

Data are shown as mean ± SD, n = 5

Similar to Chico Wash and 50 ppm chlorine treatments on spinach samples, hydrogen peroxide caused 0.8-1.2 log reduction at day 0. There were 1.0-1.3 log reduction for both day 1 and day 3. (Table 8).

TABLE 8

Survival of *E. coli* K-12 on spinach samples (Log CFU/g) after 5 washes in 3% hydrogen peroxide

| Sample | E. coli K-12 population on spinach | | |
|---|---|---|---|
| | Day 0 | Day 1 | Day 3 |
| Positive | 4.56 ± 0.21 | 4.87 ± 0.17 | 4.83 ± 0.09 |
| 1st wash | 3.74 ± 0.08 | 3.58 ± 0.14 | 3.69 ± 0.05 |
| 2nd wash | 3.58 ± 0.16 | 3.76 ± 0.30 | 3.54 ± 0.10 |
| 3rd wash | 3.36 ± 0.28 | 3.83 ± 0.17 | 3.84 ± 0.14 |
| 4th wash | 3.76 ± 0.14 | 3.66 ± 0.19 | 3.67 ± 0.18 |
| 5th wash | 3.37 ± 0.29 | 3.62 ± 0.16 | 3.74 ± 0.02 |

Data are shown as mean ± SD, n = 5

Comparison of bacterial log reductions on spinach among various sanitizers: Table 9 shows the log reductions on spinach samples after 5 washes with various sanitizers tested in this study. Tap water treatment showed up to 1.1 log reduction at day 0, but there were only 0.7-0.8 log reduction at day 3. Compared to chlorine and hydrogen peroxide, 0.3% oregano oil with or without saponin, pH 2.4 Chico Wash combined with 0.125% lemongrass oil or 0.1% oregano oil and saponin showed better effects in reducing bacterial population on spinach samples: the 0.3% oregano oil with saponin caused the highest reductions at day 0 (3.6 log), 1 (4.9 log) and 3 (4.7 log). The 0.3% oregano oil with saponin showed greater log reductions than the 0.3% oregano oil without saponin

TABLE 9

Bacterial reductions (Log CFU/g) on spinach samples after sanitizer treatments

| | Day 0 | Day 1 | Day 3 |
|---|---|---|---|
| Tap water | 0.9-1.1 | 0.1-1.0 | 0.7-0.8 |
| 50 ppm chlorine | 1.1-1.6 | 0.7-1.0 | 0.5-0.7 |
| 3% hydrogen peroxide | 0.8-1.2 | 1.0-1.3 | 1.0-1.3 |
| pH 2.4 Chico Wash with 0.125% lemongrass oil and saponin | 1.1-2.0 | 1.4-3.6 | 1.2-3.4 |
| pH 2.4 Chico Wash with 0.1% oregano oil and saponin | 1.4-2.1 | 1.3-3.2 | 1.0-3.2 |
| 0.3% oregano oil with saponin | 1.1-3.6 | 1.7-4.9 | 1.2-4.7 |
| 0.3% oregano oil without saponin | 1.4-3.1 | 1.2-3.4 | 1.4-3.1 |

Conclusion

Among all the solutions tested, the 0.3% oregano oil with 0.005% saponin microemulsion showed the greatest bacterial reduction at day 0, 1 and 3. The 0.3% oregano oil with saponin caused greater bacterial log reductions than the same concentration of oregano oil without saponin. The results showed an improvement in bacterial reduction due to the addition of Quillaja saponin.

Example 2

Ozonized Water with Plant Antimicrobials Inactivates Bacteria

Introduction

The use of plant antimicrobial combinations along with ozone has several advantages. The use of Quillaja saponins and olive extracts could help in better dispersion of the essential oils in water. While both olive extract and oregano oil have demonstrated antimicrobial activity against foodborne pathogens on organic leafy green surfaces, the combinations of these compounds with ozonized water could present multiple hurdles to bacterial pathogens and result in increased antimicrobial activity. The objective of this study was to evaluate the efficacy of ozone in combination with plant extracts, essential oils and their active components in reducing *Salmonella* population on iceberg lettuce leaves.

Materials and Methods

Bacterial culture: *Salmonella enterica* serovar Newport SN78 (bovine isolate; provided by Dr. Marilyn Erickson, University of Georgia, Griffin, GA) was used for this experiment. Dual antibiotic resistance (100 µg/ml ampicillin and 25 µg/ml streptomycin, Amresco, Solon, OH) was developed in the strain through incremental antibiotic exposure. The antibiotic resistance pattern of this strain provided efficient traceability in soil and composts and the strain had growth rate comparable to that of the parent strain. The frozen stock culture was initially revived through two transfers into brain heart infusion broth (BHIB) (Becton, Dickinson and Co (BD), Sparks, MD) followed by isolation on xylose lysine desoxycholate (XLD) agar (Becton, Dickinson and Co (BD), Sparks, MD) containing 100 µg/ml ampicillin and 25 µg/ml streptomycin.

Inoculum Preparation: For each experiment, a 20 hour overnight culture was prepared by inoculating 100 µl of the culture in 30 ml of tryptic soy broth (TSB) containing 100 µg/ml ampicillin and 25 µg/ml streptomycin and incubating at 37° C. in a desktop orbital shaker at 200 rpm (MaxQ 4450, Thermo Scientific, Dubuque, IA, USA). The cells in the medium were pelleted by centrifugation at 4000 g (Eppendorf Model 5810, Hamburg, Germany) and the supernatant was discarded. The pellet was washed in 20 ml phosphate buffered saline (PBS, Difco, Becton Dickinson, Sparks, MD) twice and suspended in 180 ml of PBS in a sterile 1 L stomacher bag (Nasco Whirl-Pak®, Fort Atkinson, WI, USA) to obtain a final concentration of approximately 6.5±1 log CFU/g.

Produce preparation and inoculation: Organic iceberg lettuce was purchased from a local grocery store in Tucson, Arizona. The four outer leaves of the iceberg lettuce were removed and discarded. Whole leaf samples (10 g±0.5 g each) were used. The iceberg lettuce samples were inoculated by immersing 10 g portions into the PBS-S. Newport suspension for 2 minutes. After immersion, the excess culture suspension was allowed to drain from the leaf and the leaves were allowed to dry in a biohood for 1 hour to aid in the attachment of S. Newport to the leaf surface.

Antimicrobial wash solution preparation: The test plant-based antimicrobials used in this study consisted of oregano oil made from pure *Origanum vulgare* (Lhasa Karnak Company, Berkeley, California), its active component carvacrol (98% pure, molecular weight 150.2, CAS no. 499-75-2, Sigma, St. Louis, MO), olive extract (CreAgri, Hayward, CA), and quillaja saponin made from *Quillaja saponaria* (Sigma Aldrich, St. Louis, MO). Oregano oil (essential oil) was tested at a 0.1% (v/v) concentration and its active component carvacrol at concentrations of 0.1-0.5% (v/v). Olive extract was tested at concentrations of 1 and 5%. Saponin was added at 0.0001%. All plant antimicrobials were prepared by mixing thoroughly in 2 L PBS.

Ozone equipment: Ozone gas was generated using an ozone generator (ForeverOzone™ OG-5G-BB). The unit consisted of a 5 KV transformer, a 25 LPM air pump, 110 CFM, 120 mm AC fan for cooling and a corona discharge generator producing 5000 mg/h of ozone. Ozone was generated into the produce wash suspension using a modified sparger as described previously (Dev Kumar et al., *Food Control* 59:172-177, 2016). The "perforated tube" sparger consisted of Clear PVC tubing, 30 cm (Nalgene 180 clear plastic tubing, I.D. ⅛ inch×O.D. 3/16 inch×Wall 1/32 inch, Nalgene Nunc Int. Corp; Rochester, NY) that was perforated with a 12 gauge insulin syringe (Walgreens, Tucson, AZ). Perforations were created throughout the tubing (100/cm). The ozone generator was connected to the perforated tube sparger using a T connector (Thermo Scientific, Hudson, NH).

Ozone measurement: Residual ozone in wash waters was measured using a spectrophotometer (Spectronic 200, Thermo Fisher Scientific, Waltham, MA) for a concentration range of 0.01 to 0.1 mg $O_3$/L using the Indigo Colorimetric Method (Standard methods for the examination of waters and waste waters, 20th edition) (APHA, 2005). Briefly, 10 ml of Indigo reagent 1 (20 ml potassium indigo trisulfonate stock solution, 10 g sodium dihydrogen phosphate, 7 ml concentrated sulfuric acid) was added to two sterile 100 ml measuring cylinders. The ozonized water was added to one cylinder and regular deionized water was added to the blank cylinder. The absorbance difference was measured between the two solutions at 600 nm to determine ozone content in the aqueous form.

Ozone-plant antimicrobial Treatment: The 2 L aliquot of PBS-antimicrobial suspension was placed in a 5 L sterile stomacher bag. The bag was cooled to a temperature of 1-4° C. using a combination of ice and dry ice for the entire duration of the ozonation treatment. The water was chilled to promote better retention of ozone in the aqueous phase (Dev Kumar et al., *Food Control* 59:172-177, 2016). The perforated ozone sparger was placed at the bottom of the bag and the water was circulated using an aquarium pump (Top Fin® Power Head 50, PetSmart, Tucson, AZ) for better dispersion of the ozone molecules and suspension of the oils. Ozone was introduced into the wash suspension for 30 minutes before leaf treatment. Leaf treatments were performed for 60, 90 and 120 minutes when the wash water suspension contained individual plant antimicrobials (oregano oil, olive extract) and for 60 and 90 minutes when carvacrol was used. When combinations of plant antimicrobials with saponin were evaluated, ozonation was carried out for a duration of 20 minutes.

Microbiological analysis: Leaf samples were collected immediately after treatment for the enumeration of surviving *Salmonella*. Leaf samples (10 g) were pummeled in the stomacher at normal speed (230 rpm) in 90 ml BPW for 1 min. Enumeration of survivors following treatment was carried out by spread plating the serially diluted above-mentioned suspensions on XLD agar containing 100 µg/ml ampicillin, and 25 µg/ml streptomycin. The plates were incubated at 37° C. for 24 hours and the *Salmonella* colonies were counted.

Statistical Analysis: All ozone-plant antimicrobial combination treatments of iceberg lettuce leaves were carried out in triplicate. The experiment for the studies was a randomized blocked design factorial treatment arrangement, repeated measures with sampling, blocked on replication. Means were separated using Least Square Means using JMP® Pro version 11 (SAS Institute, Inc., Cary, NC). Significant differences are defined at $p<0.05$ Results Iceberg lettuce leaf treatment with ozone: Immersion of S. Newport contaminated iceberg lettuce leaves in ozonized water resulted in a decrease of 1.76±0.27, 1.67±0.28, and 2.09±0.54 Log CFU/g in S. Newport population after 60, 90 and 120 min of exposure, respectively (FIG. 1). The concentration of ozone in water reached 0.17±0.04, 0.18±0.04, and 0.23±0.07 mg/L at 60, 90, and 120 min, respectively.

Figure 2:
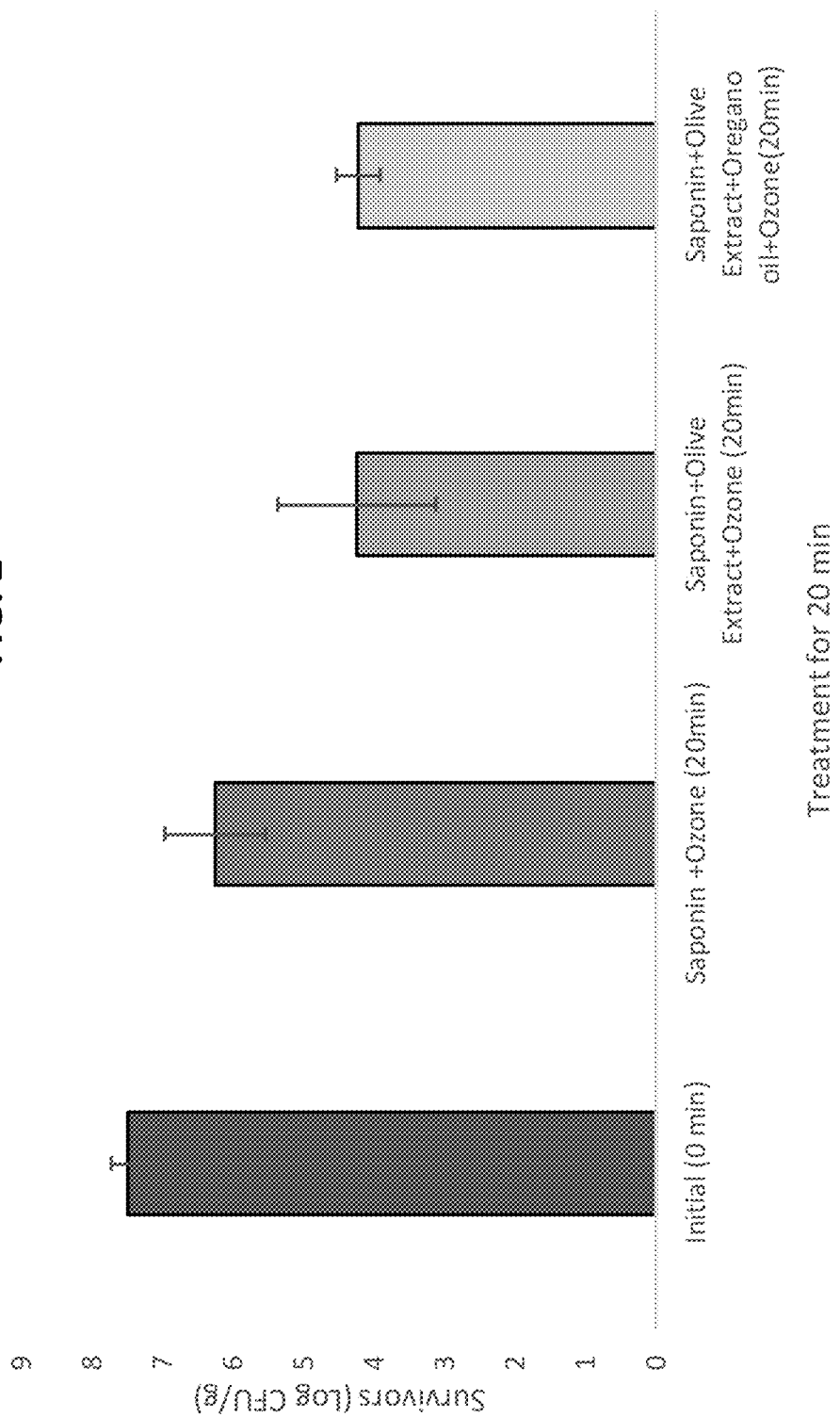
FIG. 2 is a graph showing comparative evaluation of the antimicrobial efficacy of ozone+saponin (0.0001%), ozone+saponin (0.0001%)+olive extract (1%) and ozone+oregano oil (0.1%)+saponin (0.0001%)+olive extract (1%) against S. Newport for 20 minutes (survivors shown in log CFU/g) on iceberg lettuce leaves.

Iceberg lettuce leaf treatment with ozone-saponin: Quillaja saponin (0.0001%) did not exhibit bactericidal activity against S. Newport on iceberg lettuce leaves over a 20 minute duration when used individually. The use of the ozone-quillaja saponin combination reduced the population of S. Newport on iceberg lettuce leaves by 1.24±0.44 log CFU/g after 20 minutes of treatment (FIG. 2). The addition of saponin to the wash water resulted in the quenching of ozone and a reduction in the concentration of ozone below detectable limits.

Iceberg lettuce leaf treatment with ozone-oregano oil combination: Treating iceberg lettuce leaves with ozone in combination with 0.1% (v/v) oregano oil resulted in reductions of 4.14±1.8, 3.42±1.74, and 3.08±1.57 log CFU/g after 60, 90, and 120 min exposure, respectively (FIG. 1) and resulted in a significant decrease in S. Newport populations at the end of the treatment durations in comparison to the initial population ($p<0.05$). An increase in treatment duration did not result in increased antimicrobial activity. Use of ozone+0.5% oregano oil combination resulted in reduction of S. Newport population to below the limit of detection (10 CFU/g) from an initial population of 6.39±0.5 log CFU/g (FIG. 1) after 60 minutes of treatment ($p<0.05$), indicating that the concentration of oregano oil significantly affected the antimicrobial efficacy of the treatment. Addition of oregano oil to the ozonized water affected the ability to determine changes in absorption of indigo reagent because of color change of water and the possible quenching of residual ozone.

Iceberg lettuce leaf treatment with ozone-olive extract combinations: Treatment of iceberg lettuce with ozone and olive extract combinations was performed for durations of 60, 90 and 120 minutes. The concentrations of olive extract used for the combination wash with ozone were 1% and 5%. The use of 1% olive extract resulted in a decrease in S. Newport population on iceberg lettuce leaves by 2.54±0.79, 2.48±0.28, and 2.23±0.45 log CFU/g ($p<0.05$) after 60, 90, and 120 minutes, respectively (FIG. 1). The use of 5% olive extract in combination with ozone for 60, 90, and 120 min resulted in a 3.64±1.57, 3.57±1.3, and 4.2±1.57 log CFU/g reduction ($p<0.05$) of S. Newport on iceberg lettuce, respectively (FIG. 1). The concentration of olive extract used affected the efficacy of the treatment, as 5% resulted in more S. Newport reduction than 1%. The combined use of quillaja saponin, olive extract (1%), and ozone for washing iceberg lettuce for a duration of 20 minutes resulted in a 3.24±0.58 log CFU/g ($p<0.05$) decrease in S. Newport population on iceberg lettuce leaf (FIG. 2). A plant antimicrobial combination ozone wash containing quillaja saponin, olive extract (1%), and oregano oil (0.1%) for a duration of 20 minutes resulted in a 3.27±0.53 log CFU/g reduction in S. Newport population ($p<0.05$) (FIG. 2).

Iceberg lettuce leaf treatment with ozone-carvacrol combinations: Combination treatments of ozone with carvacrol were performed for 60 and 90 minutes. The concentrations of carvacrol used were 0.1%, 0.3%, and 0.5%. The use of carvacrol in combination with ozone at all three concentrations and both treatment times resulted in reduction of S. Newport populations to levels below detection. The use of 0.1, 0.3, and 0.5% carvacrol in combination with ozone for 60 minutes resulted in reductions of 5.11±0.38, 5.99±0.52, and 7.29±0.32 log CFU/g of S. Newport, respectively. The use of 0.1, 0.3, and 0.5% carvacrol in combination with ozone for 90 minutes resulted in reductions of 6.34±1.69, 6.55±1.3, and 7.54±0.21 log CFU/g S. Newport, respectively.

Discussion

The present study involved the use of ozonized water in combination with oregano oil, olive extract, carvacrol, and saponins against S. Newport. An isolate from bovine origin was chosen, as leafy greens can be contaminated by cattle feedlot run-off and contact with manure. Previous research with aqueous ozone washing of leafy greens have indicated mixed outcomes. The washing of cilantro leaves with ozonized water did not decrease total plate counts after treatment (Wang et al., *Food Res. Int.* 37:949-956, 2004), while exposing shredded lettuce to aqueous ozone for 3 minutes resulted in decreased counts of mesophilic and psychrotrophic bacteria by 1.4 and 1.8 log CFU/g, respectively (Kim et al., *J. Food Safety* 19:17-34, 1999). Research with plant compounds has indicated that antimicrobial activity could be dose dependent. The use of 5% and 1% olive extract resulted in 1.7 and 1.4 Log CFU/g reduction in S. Newport population, respectively, on iceberg lettuce (Moore et al., *J. Food Prot.* 74; 1676-1683, 2011). While the use of oregano oil at 0.1% for washing iceberg lettuce resulted in <1 log reduction, the use of 0.5% resulted in over 5 log reduction of S. Newport (Moore-Neibel et al., *Food Microbiol.* 34(1):123-129, 2012). Hence in the studies described herein, plant-based antimicrobials such as oregano oil, olive extract, and quillaja saponin were tested at low concentrations in combination with ozone to determine if there was any improvement over previously reported levels of bacterial reduction when individual components were used.

The long durations of treatments used in this study are not representative of washing practices used for individual batches in the industry, but these mimic the durations for which wash water is reused by replenishing free chlorine. Practices such as hydrocooling usually result in longer contact of produce with water, to lower the temperature of produce. Hence, the use of ozone and plant based antimicrobials can have applications in both washing and hydrocooling practices when effective concentrations of plant based antimicrobials are used. The use of ozone in combination with carvacrol (0.1%, 0.3% and 0.5%) and 0.5% oregano oil exhibited a reduction in S. Newport to below levels of detection (10 CFU/g) from initial populations exceeding 6 logs CFU/g. Earlier investigations in our laboratory with carvacrol resulted in over 5 log CFU/g reduction of S. Newport on iceberg lettuce at concentration of 0.3 and 0.5%, but not at 0.1%. Treatments in which ozone and carvacrol (0.3 and 0.5%) were used in combination resulted in no survivors of the pathogen. Previous work performed using only 0.3 and 0.5% carvacrol resulted in over 5 log CFU/g reduction (no survivors detected) of S. Newport as well, indicating that ozone might not have contributed to the decrease of S. Newport when carvacrol was used at these concentrations. Evidence of additional antimicrobial efficacy between carvacrol and ozone can be ascertained when 0.1% carvacrol was used in combination with ozone, as this treatment resulted in over 5 log CFU/g reduction, while the use of only 0.1% carvacrol resulted in 1 log CFU/g reduction.

Oregano oil has demonstrated significant antimicrobial activity against foodborne pathogens in a concentration dependent manner (Moore-Neibel et al., *Food Microbiol.* 34(1):123-129, 2012). In this study, it was observed that the use of 0.1% oregano oil had a protective effect on *Salmonella* and might have even resuscitated cells injured by the oxidative damage caused by ozone. This observation is supported by an increase in S. Newport survival on iceberg lettuce (FIG. 1) after longer treatment durations of 90 and 120 minutes, in comparison to 60 minutes.

An average concentration of 0.2 mg/L of ozone was measured in the wash water at the end of treatments. Ozone gas was delivered throughout the treatment duration to compensate for loss of aqueous ozone due to quenching by organic matter, off gassing and relatively short half-life of the ozone molecule. Organic matter consumes ozone and may compete with microorganisms, reducing the efficacy of ozone (Guzel-Seydim et al., *LWT-Food. Sci. Tech.* 37:453-460, 2004; Khadre et al., *J. Food. Sci.* 66:1242-1252, 2001; Kim et al., *J. Food Prot.* 62:1071-1087, 1999), hence, requiring continuous reintroduction of ozone into wash waters. Aqueous ozone was not detected in water containing oregano oil, olive extract, and saponins due to the possible quenching of the ozone molecule and the change in water color that affected the absorbance of the indigo reagent that was essential for measuring the dissolved ozone.

Saponin resulted in no antimicrobial activity against S. Newport when tested individually, and olive extract resulted in <2 Log CFU/g reductions in S. Newport. These reductions were lower in comparison to those obtained in treatments where ozone was used in combination with antimicrobials, indicating that the combination of ozone with plant based antimicrobials resulted in enhanced antimicrobial activity against S. Newport. The combination of 0.0001% saponin, 1% olive extract, and 0.1% oregano oil resulted in excess of 4 log CFU/g reduction of S. Newport within 20 minutes, though the treatments also resulted in significant foam formation, contributing to lowered treatment time selection than other treatments. While chlorination could result in pitting or corrosion of equipment and presence of carcinogenic byproducts, the use of quillaja saponin could be advantageous because of its detergent-like nature, which could result in reduced attachment strength of pathogenic bacteria to equipment surfaces. Hence, use of ozone in combination with plant antimicrobials could be an effective post-harvest processing step for the iceberg lettuce industry, as none of the treatments used in this study affected the appearance of iceberg lettuce by visual observation.

Example 3

Control of Biofilm Formation on Food Contact Surfaces

Evaluation of Biofilm Formation by *Salmonella enterica* and *Listeria monocytogenes* on Five Different Food Contact Surfaces A protocol based on crystal violet staining was evaluated for testing the biofilm forming abilities of two foodborne pathogens—*Salmonella enterica* and *Listeria monocytogenes*—on five different food contact surfaces: stainless steel, high density polyethylene (HDPE), polyvinyl chloride (PVC), polycarbonate (PC) and Buna-N rubber. Ten milliliters (ml) of diluted TSB (1:10 v/v) inoculated with 7 log CFU/ml of one of the test bacterial cultures (*S. enterica* or *L. monocytogenes*) was added to the food contact surface coupons. The control was autoclaved tap water. These coupons were incubated at room temperature for up to three days. After 14 hours, the coupons were rinsed in 25 ml of sterile deionized water to remove the planktonic cells and fresh TSB (diluted 1:10 v/v; without any bacteria) was added as a source of nutrients. Every 14 hours the coupons were rinsed to remove the planktonic cells and fresh diluted TSB (1:10 v/v) added. Samples were taken at days 0, 1, and 3. The coupons were rinsed in 25 ml of sterile deionized water to remove planktonic cells. The coupons were air dried, and 5 ml of crystal violet (0.1% w/v) was added and incubated at room temperature (22° C.) for 45 minutes. The dye was aspirated and the coupons were rinsed in 25 ml of sterile de-ionized water and air dried for 1 hour in a biohood following which 5 ml of 95% ethanol was added to dissolve the dye bound to the biofilm. The coupons were agitated gently for 30 minutes to dissolve the crystal violet dye, following which 100 µl ethanol was transferred to the wells of a 96-well plate. The amount of dissolved dye was quantified at an absorbance of 600 nm using a microplate spectrophotometer and the $OD_{600}$ was measured using 95% ethanol as the blank. The OD values indicate the amount of bound crystal violet and the amount of biofilm formed. The results are shown in Table 10.

A protocol based on direct plating was also evaluated for testing the biofilm formation by *Salmonella* or *L. monocytogenes*. Biofilms were formed on three different food contact surface coupons (HDPE, Buna-N rubber, and 316 stainless steel) for up to 3 days in 35 mm mini-petri dishes. Biofilms were formed using a 1:10 diluted TSB solution (10 mL) with either *S. enterica* or *L. monocytogenes* inoculum (100 µL). The diluted TSB was changed every 16-18 hours with new 1:10 diluted TSB (10 mL). Coupons were removed for sampling and enumeration of strongly attached bacteria at three different time points (Day 0, 1, and 3). The coupons were rinsed with deionized water five times to remove planktonic cells. Then the coupons were immersed in 10 mL of BPW. The coupons were sonicated for 2 minutes using different settings (Tables 11 and 12) for each organism. After sonication, the solution was serially diluted and plated on Tryptic Soy Agar (TSA). Plates were incubated at 37° C. for 24-48 hours. The colonies were counted and the colony forming units were determined for the various sonication settings, so that the appropriate setting with the most recovery could be determined. The results are shown in Tables 11 and 12. The results demonstrated that the sonication setting of 40:40 provided the best recovery for *S. enterica*, while the setting of 40:60 provided the best recovery in case of *L. monocytogenes*. These settings were used in further experiments to recover the bacterial cells from coupons during sampling and enumeration (by spread plating) of the bacteria in biofilms.

TABLE 11

Bacterial population (Log CFU/mL) recovered from the biofilms formed by *Listeria monocytogenes* on various food contact surface coupons

| Day | Sonicator | 316 stainless | BuNa—N rubber | HDPE |
|---|---|---|---|---|
| Day 0 | 20:40 | 5.08 | 5.11 | 4.88 |
|  | 40:40 | 5.02 | 5.09 | 5.19 |
|  | 40:60 | 5.27 | 5.23 | 5.37 |
|  | 60:60 | 5.13 | 5.15 | 5.35 |
| Day 1 | 20:40 | 7.60 | 7.18 | 6.64 |
|  | 40:40 | 7.28 | 7.17 | 6.62 |
|  | 40:60 | 7.62 | 7.25 | 6.29 |
|  | 60:60 | 7.59 | 7.56 | 6.61 |
| Day 3 | 20:40 | 7.52 | 7.74 | 7.20 |
|  | 40:40 | 7.63 | 7.57 | 6.81 |
|  | 40:60 | 7.48 | 7.84 | 6.83 |
|  | 60:60 | 7.61 | 7.58 | 7.02 |

TABLE 10

$OD_{600}$ values of crystal violet dye from biofilm formation by *Salmonella enterica* and *Listeria monocytogenes* on various coupons

| Day | Bacteria | HDPE | PVC | PC | Stainless steel | Buna N-rubber | Blank (95% Ethanol) |
|---|---|---|---|---|---|---|---|
| Day 0 | *S. enterica* | 0.057 | 0.06 | 0.063 | 0.057 | 0.448 | 0.043 |
|  | *L. monocytogenes* | 0.073 | 0.083 | 0.076 | 0.045 | 1.032 | 0.042 |
|  | Control | 0.068 | 0.059 | 0.062 | 0.048 | 0.958 | 0.042 |
| Day 1 | *S. enterica* | 0.548 | 1.234 | 0.548 | 0.77 | 3.253 | 0.04 |
|  | *L. monocytogenes* | 0.313 | 0.38 | 0.889 | 1.031 | 1.56 | 0.041 |
|  | Control | 0.079 | 0.065 | 0.067 | 0.05 | 1.005 | 0.041 |
| Day 3 | *S. enterica* | 1.913 | 1.621 | 1.536 | 1.208 | 3.817 | 0.04 |
|  | *L. monocytogenes* | 1.494 | 2.573 | 1.656 | 1.773 | 3.667 | 0.044 |
|  | Control | 0.064 | 0.086 | 0.065 | 0.052 | 0.865 | 0.041 |

TABLE 12

Bacterial population (Log CFU/mL) recovered from the biofilms formed by *Salmonella* Newport on various food contact surface coupons

| Day | Sonicator | 316 stainless | BuNa—N rubber | HDPE |
|---|---|---|---|---|
| Day 0 | 20:20 | 5.44 | 5.13 | 4.30 |
|  | 20:40 | 5.46 | 4.27 | 5.20 |
|  | 40:40 | 5.30 | 5.31 | 5.13 |
|  | 40:60 | 5.41 | 5.71 | 5.96 |
| Day 1 | 20:20 | 7.16 | 7.00 | 6.80 |
|  | 20:40 | 7.15 | 7.10 | 6.93 |
|  | 40:40 | 7.07 | 7.06 | 7.02 |
|  | 40:60 | 6.77 | 7.04 | 6.97 |
| Day 3 | 20:20 | 7.13 | 6.98 | 6.86 |
|  | 20:40 | 7.45 | 7.40 | 7.38 |
|  | 40:40 | 7.53 | 7.71 | 7.21 |
|  | 40:60 | 7.35 | 7.38 | 7.39 |

The results demonstrated that foodborne pathogenic bacteria evaluated (*S. enterica* and *L. monocytogenes*) can form biofilms on various produce contact surfaces such as stainless steel, HDPE, PVC, PC, and Buna N-rubber. The biofilms formed on these surfaces can be detected either by crystal violet staining or direct plating methods.

Reduction of Biofilm Formation on Food Contact Surfaces by Natural Sanitizers

The food contact surface coupons were immersed in plant extract, essential oil, and/or 0.0001% emulsifier (Quillaja saponin) for 30 minutes. The coupons were removed from the solutions and inoculated with *S. enterica* or *L. monocytogenes* and the biofilm formation was evaluated using the crystal violet staining method described above. The OD values of the crystal violet solutions are shown in Tables 13-15. Various concentrations of oregano oil (0.5%, 0.7%, and 1.0%) with emulsifier were also tested against *S. enterica* biofilm formation on food contact surfaces (Table 16).

TABLE 13

$OD_{600}$ values of crystal violet dye from biofilm formation on various coupons by *Salmonella enterica* and *Listeria monocytogenes* after treatment with 0.0001% Quillaja saponin alone.

| Day | Bacteria | Buna N-rubber | Stainless steel 304 | Stainless steel 316 | HDPE | PC | PVC |
|---|---|---|---|---|---|---|---|
| Day 0 | *S. enterica* | 0.820 ± 0.654 | 0.091 ± 0.032 | 0.086 ± 0.005 | 0.090 ± 0.009 | 0.088 ± 0.003 | 0.071 ± 0.006 |
|  | *L. monocytogenes* | 0.275 ± 0.136 | 0.074 ± 0.019 | 0.073 ± 0.006 | 0.074 ± 0.005 | 0.076 ± 0.010 | 0.083 ± 0.028 |
| Day 1 | *S. enterica* | 0.514 ± 0.249 | 0.167 ± 0.039 | 0.157 ± 0.057 | 0.220 ± 0.119 | 0.243 ± 0.179 | 0.141 ± 0.083 |
|  | *L. monocytogenes* | 0.315 ± 0.087 | 0.136 ± 0.098 | 0.146 ± 0.122 | 0.149 ± 0.116 | 0.177 ± 0.173 | 0.092 ± 0.049 |
| Day 3 | *S. enterica* | 0.581 ± 0.221 | 0.505 ± 0.159 | 0.224 ± 0.043 | 0.314 ± 0.141 | 0.375 ± 0.050 | 0.358 ± 0.100 |
|  | *L. monocytogenes* | 0.548 ± 0.236 | 0.295 ± 0.012 | 0.180 ± 0.041 | 0.553 ± 0.381 | 0.854 ± 0.572 | 0.391 ± 0.217 |

TABLE 14

$OD_{600}$ values of crystal violet dye from biofilm formation on various coupons by *Salmonella enterica* and *Listeria monocytogenes* after treatment with 3% olive extract

| Day | Bacteria | Buna N-rubber | Stainless steel 304 | Stainless steel 316 | HDPE | PC | PVC |
|---|---|---|---|---|---|---|---|
| Day 0 | *S. enterica* | 0.532 ± 0.143 | 0.182 ± 0.105 | 0.144 ± 0.077 | 0.219 ± 0.170 | 0.147 ± 0.069 | 0.119 ± 0.027 |
|  | *L. monocytogenes* | 0.253 ± 0.013 | 0.161 ± 0.044 | 0.127 ± 0.024 | 0.170 ± 0.086 | 0.124 ± 0.032 | 0.137 ± 0.039 |
| Day 1 | *S. enterica* | 0.444 ± 0.055 | 0.304 ± 0.225 | 0.434 ± 0.369 | 0.404 ± 0.283 | 0.403 ± 0.489 | 0.219 ± 0.136 |
|  | *L. monocytogenes* | 0.488 ± 0.054 | 0.367 ± 0.208 | 0.524 ± 0.489 | 0.392 ± 0.258 | 0.150 ± 0.033 | 0.152 ± 0.029 |
| Day 3 | *S. enterica* | 0.678 ± 0.273 | 0.413 ± 0.261 | 0.231 ± 0.062 | 0.322 ± 0.183 | 0.251 ± 0.149 | 0.354 ± 0.260 |
|  | *L. monocytogenes* | 0.506 ± 0.103 | 0.244 ± 0.139 | 0.246 ± 0.120 | 0.278 ± 0.163 | 0.393 ± 0.298 | 0.263 ± 0.149 |

TABLE 15

$OD_{600}$ values of crystal violet dye from biofilm formation on various coupons by *Salmonella enterica* and *Listeria monocytogenes* after treatment with 0.3% oregano oil and 0.0001% saponin microemulsion

| Day | Bacteria | Buna N-rubber | Stainless steel 304 | Stainless steel 316 | HDPE | PC | PVC |
|---|---|---|---|---|---|---|---|
| Day 0 | *S. enterica* | 1.015 ± 0.379 | 0.556 ± 0.092 | 0.615 ± 0.239 | 0.949 ± 0.737 | 1.516 ± 0.191 | 0.934 ± 0.428 |

TABLE 15-continued

OD$_{600}$ values of crystal violet dye from biofilm formation on various coupons by *Salmonella enterica* and *Listeria monocytogenes* after treatment with 0.3% oregano oil and 0.0001% saponin microemulsion

| Day | Bacteria | Buna N-rubber | Stainless steel 304 | Stainless steel 316 | HDPE | PC | PVC |
|---|---|---|---|---|---|---|---|
| | *L. monocytogenes* | 0.504 ± 0.019 | 0.239 ± 0.018 | 0.676 ± 0.651 | 0.417 ± 0.103 | 0.775 ± 0.470 | 1.023 ± 0.444 |
| Day 1 | *S. enterica* | 0.637 ± 0.303 | 0.731 ± 0.354 | 0.562 ± 0.339 | 1.829 ± 1.678 | 2.011 ± 1.391 | 1.805 ± 1.550 |
| | *L. monocytogenes* | 0.640 ± 0.366 | 0.417 ± 0.057 | 0.414 ± 0.079 | 1.640 ± 1.722 | 1.501 ± 1.101 | 0.793 ± 0.281 |
| Day 3 | *S. enterica* | 0.612 ± 0.275 | 0.379 ± 0.085 | 0.294 ± 0.113 | 0.336 ± 0.141 | 0.307 ± 0.359 | 0.582 ± 0.276 |
| | *L. monocytogenes* | 0.476 ± 0.185 | 0.235 ± 0.032 | 0.233 ± 0.164 | 0.281 ± 0.137 | 0.336 ± 0.152 | 0.712 ± 0.300 |

TABLE 16

OD$_{600}$ values of crystal violet dye recovered from coupons inoculated with *Salmonella enterica* after a two minute treatment with 0.5%, 0.7% and 1.0% oregano oil and 0.0001% saponin microemulsions on Day 0, 1 and 3

| Coupon | Day 0 | Day 1 | Day 3 |
|---|---|---|---|
| 0.5% oregano oil microemulsion | | | |
| 304 SS | 0.085 | 0.056 | 0.134 |
| 316 SS | 0.071 | 0.068 | 0.116 |
| Buna N | 0.484 | 0.493 | 0.239 |
| PVC | 0.124 | 0.119 | 0.193 |
| PC | 0.339 | 0.201 | 0.105 |
| HDPE | 0.349 | 0.072 | 0.329 |
| 0.7% oregano oil microemulsion | | | |
| 304 SS | 0.158 | 0.248 | 0.780 |
| 316 SS | 0.103 | 0.198 | 0.681 |
| Buna N | 0.255 | 0.654 | 0.763 |
| PVC | 0.133 | 0.117 | 1.127 |
| PC | 0.369 | 0.230 | 0.270 |
| HDPE | 0.115 | 0.074 | 0.609 |
| 1.0% oregano oil microemulsion | | | |
| 304 SS | 0.073 | 0.192 | 0.575 |
| 316 SS | 0.077 | 0.083 | 0.611 |
| Buna N | 0.779 | 0.729 | 0.610 |
| PVC | 0.553 | 0.101 | 0.881 |
| PC | 3.737 | 0.264 | 0.355 |
| HDPE | 0.362 | 0.072 | 0.290 |

The reduction in bacterial biofilm formation was also tested using a direct plating method. Biofilms were formed on six different food contact surface coupons (HDPE, Buna-N rubber, PC, PVC, and stainless steel 304 and 316) in separate 35 mm mini-petri dishes and evaluated at three different time points (Day 0, 1, and 3). Biofilms were formed using a 1:10 diluted TSB solution (10 mL) with either *S. enterica* or *L. monocytogenes* inoculum (100 μL). The coupons were also washed and treated with antimicrobial solutions containing the plant-based emulsifier and the essential oil/plant extracts at various concentrations. The diluted TSB was changed every 16-18 hours with new 1:10 diluted TSB (10 mL). The coupons were rinsed in the antimicrobial solution before adding them to the petri dishes containing the fresh, diluted TSB. After their specific time points, coupons were removed aseptically using sterile forceps from the petri dish. The coupons were rinsed by submerging in 25 mL of sterile deionized H$_2$O and swirled five times to remove planktonic cells. After rinsing, they were placed into a new petri dish immersed in 10 mL of BPW. The coupons were sonicated for 2 minutes on ice using different settings for each organism. After sonication, the sonicated solution was serially diluted using 0.1% peptone water and spread plated on TSA in duplicate. Plates were incubated overnight at 37° C. for 24-48 hours, after which, the colonies were counted, to establish the efficacy of the antimicrobial solutions (Tables 17-25). The results indicate that the plant-based antimicrobial microemulsions can prevent biofilm formation by *S. enterica* and *L. monocytogenes* on various produce contact surfaces.

TABLE 17

Enumeration of surviving population of *Salmonella* (Log CFU/mL) after biofilm formation upon exposure to 0.1% oregano oil + 0.0001% plant emulsifier microemulsion

| Coupons | Day 0 | Day 1 |
|---|---|---|
| Stainless steel 304 | 4.47 | 4.27 |
| Stainless steel 316 | 4.25 | 4.26 |
| PC | 4.20 | 4.20 |
| PVC | 3.54 | 4.43 |
| HDPE | 3.48 | 4.56 |
| Buna rubber | 3.59 | 4.79 |

TABLE 18

Enumeration of surviving population of *Listeria monocytogenes* (Log CFU/mL) after biofilm formation upon exposure to 0.1% oregano oil + 0.0001% plant emulsifier microemulsion

| Coupons | Day 0 | Day 1 |
|---|---|---|
| Stainless steel 304 | 4.28 | 4.27 |
| Stainless steel 316 | 4.10 | 4.14 |
| PC | 3.83 | 4.40 |
| PVC | 3.70 | 4.65 |
| Buna rubber | 3.55 | 4.43 |
| HDPE | 3.85 | 4.72 |

TABLE 19

Enumeration of surviving population of *Salmonella* (Log CFU/mL) after biofilm formation upon exposure to 0.5% oregano oil or lemongrass oil + 0.0001% plant emulsifier microemulsion at Day 0

| Coupons | 0.5% oregano oil | 0.5% lemongrass oil |
|---|---|---|
| Stainless steel 304 | <2Log | 4.51 |
| Stainless steel 316 | <2Log | 4.63 |
| PC | <2Log | 4.64 |

TABLE 19-continued

Enumeration of surviving population of *Salmonella* (Log CFU/mL) after biofilm formation upon exposure to 0.5% oregano oil or lemongrass oil + 0.0001% plant emulsifier microemulsion at Day 0

| Coupons | 0.5% oregano oil | 0.5% lemongrass oil |
|---|---|---|
| PVC | <2Log | 4.63 |
| Buna rubber | <2Log | 4.76 |
| HDPE | <2Log | 4.56 |

TABLE 20

Enumeration of surviving population of *Listeria monocytogenes* (Log CFU/mL) after biofilm formation upon exposure to 0.5% oregano oil or lemongrass oil + 0.0001% plant emulsifier microemulsion at Day 0

| Coupons | 0.5% oregano oil | 0.5% lemongrass oil |
|---|---|---|
| Stainless steel 304 | <2Log | 4.54 |
| Stainless steel 316 | <2Log | 4.62 |
| PC | <2Log | <2 Log |
| PVC | <2Log | <2 Log |
| Buna rubber | <2Log | 4.96 |
| HDPE | <2Log | 4.65 |

TABLE 21

Population of survivors of *Salmonella* Newport (Log CFU/mL) on various food contact surfaces upon two-minute treatment with 0.5% plant antimicrobial with 0.0001% saponin microemulsions on Day 0, 1 and 3

| Coupons | Carvacrol | Oregano oil | Citral | Lemongrass oil | Cinnamaldehyde | Cinnamon Oil |
|---|---|---|---|---|---|---|
| Day 0 | | | | | | |
| 304 SS | 4.75 | <1 | 4.32 | 4.53 | 4.31 | 3.38 |
| 316 SS | 4.66 | <1 | 4.36 | 4.58 | 4.30 | 3.47 |
| Buna N | 4.19 | <1 | 4.06 | 4.74 | 4.23 | 4.28 |
| PVC | 2.74 | <1 | 3.49 | 4.96 | 3.93 | 4.37 |
| PC | <1 | <1 | 3.25 | 4.57 | 4.06 | 4.37 |
| HDPE | <1 | <1 | 3.44 | 4.87 | 4.27 | 4.38 |
| Day 1 | | | | | | |
| 304 SS | 4.26 | 4.39 | 4.52 | 4.48 | 4.45 | 4.36 |
| 316 SS | 4.42 | 4.60 | 4.52 | 4.55 | 4.48 | 4.39 |
| Buna N | 4.65 | 4.81 | 4.34 | 4.83 | 4.87 | 4.76 |
| PVC | 4.24 | 4.13 | 4.27 | <1 | 4.36 | 4.55 |
| PC | <1 | <1 | 4.20 | 4.87 | 4.20 | 4.26 |
| HDPE | <1 | <1 | 4.24 | <1 | 4.24 | 4.34 |
| Day 3 | | | | | | |
| 304 SS | <1 | <1 | 4.20 | 4.24 | 4.39 | 4.24 |
| 316 SS | <1 | <1 | 4.36 | 4.32 | 4.26 | 4.20 |
| Buna N | <1 | <1 | 4.20 | 4.34 | 4.34 | 4.55 |
| PVC | <1 | <1 | 4.27 | <1 | 4.21 | 4.27 |
| PC | <1 | <1 | 3.52 | 4.62 | 3.75 | 3.26 |
| HDPE | <1 | <1 | 3.56 | <1 | 3.24 | 3.34 |

TABLE 22

Population of survivors of *Salmonella* Newport (Log CFU/mL) on various food contact surfaces upon two-minute treatment with 0.7% plant antimicrobial with 0.0001% saponin microemulsions on Day 0, 1 and 3

| Coupons | Carvacrol | Oregano oil | Citral | Lemongrass oil | Cinnamaldehyde | Cinnamon Oil |
|---|---|---|---|---|---|---|
| Day 0 | | | | | | |
| 304 SS | 4.57 | 4.40 | 4.23 | 3.71 | 4.0 | 4.30 |
| 316 SS | 4.24 | 3.30 | 3.59 | 4.16 | 4.68 | 4.06 |
| Buna N | 4.44 | 4.33 | 4.52 | 4.05 | 4.08 | 3.77 |
| PVC | 4.63 | 4.01 | 3.24 | 3.71 | <1 | 4.10 |
| PC | 4.18 | 3.77 | 3.59 | 4.07 | 4.11 | 4.11 |
| HDPE | 4.24 | 3.42 | 2.71 | 3.36 | 4.42 | 3.06 |
| Day 1 | | | | | | |
| 304 SS | <1 | <1 | 3.36 | 3.66 | 3.68 | 3.32 |
| 316 SS | <1 | <1 | 3.24 | 3.15 | 3.0 | 3.20 |
| Buna N | <1 | <1 | 3.52 | 3.20 | 3.24 | 3.38 |
| PVC | <1 | <1 | <1 | <1 | <1 | <1 |
| PC | <1 | <1 | <1 | <1 | 3.29 | <1 |
| HDPE | <1 | <1 | <1 | <1 | <1 | <1 |
| Day 3 | | | | | | |
| 304 SS | <1 | <1 | <1 | <1 | <1 | <1 |
| 316 SS | <1 | <1 | <1 | <1 | <1 | <1 |
| Buna N | <1 | <1 | <1 | <1 | <1 | <1 |
| PVC | <1 | <1 | <1 | <1 | <1 | <1 |
| PC | <1 | <1 | <1 | <1 | <1 | <1 |
| HDPE | <1 | <1 | <1 | <1 | <1 | <1 |

TABLE 23

Population of survivors of *Salmonella* Newport (Log CFU/mL) on various food contact surfaces upon two-minute treatment with 1% plant antimicrobial with 0.0001% saponin microemulsions on Day 0, 1 and 3

| Coupons | Carvacrol | Oregano oil | Citral | Lemongrass oil | Cinnamaldehyde | Cinnamon Oil |
|---|---|---|---|---|---|---|
| Day 0 | | | | | | |
| 304 SS | <1 | <1 | 3.91 | 3.36 | <1 | 4.52 |
| 316 SS | <1 | <1 | 4.13 | 3.81 | <1 | 4.38 |
| Buna N | <1 | <1 | 3.26 | 4.30 | <1 | 4.12 |
| PVC | <1 | <1 | 3.89 | 3.42 | <1 | 3.12 |
| PC | <1 | <1 | 4.20 | 3.63 | <1 | 3.60 |
| HDPE | <1 | <1 | 4.45 | 3.39 | <1 | <1 |

TABLE 23-continued

Population of survivors of *Salmonella* Newport (Log CFU/mL) on various food contact surfaces upon two-minute treatment with 1% plant antimicrobial with 0.0001% saponin microemulsions on Day 0, 1 and 3

| Coupons | Carvacrol | Oregano oil | Citral | Lemongrass oil | Cinnamaldehyde | Cinnamon Oil |
|---|---|---|---|---|---|---|
| Day 1 | | | | | | |
| 304 SS | <1 | <1 | <1 | <1 | <1 | <1 |
| 316 SS | <1 | <1 | <1 | <1 | <1 | <1 |
| Buna N | <1 | <1 | <1 | <1 | <1 | <1 |
| PVC | <1 | <1 | <1 | <1 | <1 | <1 |
| PC | <1 | <1 | <1 | <1 | <1 | <1 |
| HDPE | <1 | <1 | <1 | <1 | <1 | <1 |
| Day 3 | | | | | | |
| 304 SS | <1 | <1 | <1 | <1 | <1 | <1 |
| 316 SS | <1 | <1 | <1 | <1 | <1 | <1 |
| Buna N | <1 | <1 | <1 | <1 | <1 | <1 |
| PVC | <1 | <1 | <1 | <1 | <1 | <1 |
| PC | <1 | <1 | <1 | <1 | <1 | <1 |
| HDPE | <1 | <1 | <1 | <1 | <1 | <1 |

TABLE 24

Population of survivors of *Listeria monocytogenes* (Log CFU/mL) on various food contact surfaces upon two-minute treatment with 5% plant extracts on Day 0, 1 and 3.

| Coupons | Apple extract | Grapeseed extract | Olive extract |
|---|---|---|---|
| Day 0 | | | |
| 304 SS | 4.24 | 4.38 | 3.68 |
| 316 SS | 4.20 | 4.24 | 3.56 |
| Buna N | 4.85 | 4.76 | 3.85 |
| PVC | 4.36 | 4.53 | 3.20 |
| PC | 4.38 | 4.26 | 3.24 |
| HDPE | 4.24 | 4.15 | 3.63 |
| Day 1 | | | |
| 304 SS | 3.64 | 3.26 | <1 |
| 316 SS | 3.66 | 3.15 | <1 |
| Buna N | 3.85 | 3.20 | <1 |
| PVC | 3.25 | 3.24 | <1 |
| PC | 3.16 | 4.36 | <1 |
| HDPE | 3.35 | 4.53 | <1 |
| Day 3 | | | |
| 304 SS | <1 | <1 | <1 |
| 316 SS | <1 | <1 | <1 |
| Buna N | <1 | <1 | <1 |
| PVC | <1 | <1 | <1 |
| PC | <1 | <1 | <1 |
| HDPE | <1 | <1 | <1 |

TABLE 25

Population of survivors of *Listeria monocytogenes* (Log CFU/mL) on various food contact surfaces upon two-minute treatment with 7% plant extracts on Day 0, 1 and 3

| Coupons | Apple extract | Grapeseed extract | Olive extract |
|---|---|---|---|
| Day 0 | | | |
| 304 SS | <1 | <1 | <1 |
| 316 SS | <1 | <1 | <1 |
| Buna N | <1 | <1 | <1 |
| PVC | <1 | <1 | <1 |
| PC | <1 | <1 | <1 |
| HDPE | <1 | <1 | <1 |
| Day 1 | | | |
| 304 SS | <1 | <1 | <1 |
| 316 SS | <1 | <1 | <1 |
| Buna N | <1 | <1 | <1 |
| PVC | <1 | <1 | <1 |
| PC | <1 | <1 | <1 |
| HDPE | <1 | <1 | <1 |
| Day 3 | | | |
| 304 SS | <1 | <1 | <1 |
| 316 SS | <1 | <1 | <1 |
| Buna N | <1 | <1 | <1 |
| PVC | <1 | <1 | <1 |
| PC | <1 | <1 | <1 |
| HDPE | <1 | <1 | <1 |

Example 4

Efficacy of Plant-Based Antimicrobials at Low Concentrations

Pathogenic *Salmonella enterica* subspecies *enterica* serovar Newport LAJ160311, with the JJPX01.0014 PulseNet PFGE, isolated from oysters, was used for this study. S. Newport JJPX is resistant to ampicillin, chloramphenicol, streptomycin, sulfamethoxazole, tetracycline, amoxicillin-clavulanic acid, cephalothin, cefoxitin and ceftiofur, as well as a decrease in susceptibility to ceftriaxone. S. Newport was revived using Tryptic Soy Broth (TSB), diluted using peptone water and plated on xylose lysine deoxycholate (XLD) agar. Essential oils used in this study included lemongrass oil (LG), oregano oil (OO) and cinnamon oil (CO) at 0.01-0.05% concentrations. Microemulsions of essential oils were prepared by vigorously mixing them with 0.01% quillaja saponin in sterile deionized water. Peracetic acid, sterile de-ionized water and saponin were evaluated as controls.

The following concentrations of essential oils (individual and combination treatments) were evaluated: 0.05%, 0.025% and 0.01% of each of LG, CO, OO, LG+CO, LG+OO, CO+OO and LG+CO+OO (3×). Essential oil combinations divided evenly to maintain a final concentration of 0.025%, denoted by the Greek symbol Σ, (ΣLG+CO, ΣLG+OO, ΣCO+OO and Σ3×) were also evaluated in vitro. The individual and combination treatments at these concentrations were compared against 10%, 50 ppm, 20 ppm, 10 ppm, and 5 ppm peracetic acid (PAA), 0.01% saponin and sterile deionized water (diH$_2$O).

Cryogenically frozen *Salmonella* Newport was revived and passed three times in TSB. Overnight cultures were also grown in TSB that was incubated at 37° C. for 22 hours. After incubation, the overnight cultures were washed three times in PBS, by centrifuging at 4000 rpm for 10 minutes. In a sterile stomacher bag, respective concentrations and combinations of essential oils were added with 0.01% saponin diluted in sterile diH$_2$O. PAA and 0.01% saponin controls were also diluted in sterile diH$_2$O. The contents in stomacher bags were mixed thoroughly by pummeling in a stomacher at normal speed for 5 minutes to create microemulsions. After mixing, 9 mL of the individual and combination essential oil microemulsions and controls were aliquoted in 15 mL centrifuge tubes. An aliquot of 1 mL of washed overnight *Salmonella* Newport culture was added to each tube. The treatments and control solutions were vortexed on high speed, diluted in 0.1% peptone water and spread plated on XLD agar for enumeration at time 0. Afterwards, the solutions were incubated at 37° C. and samples taken for dilutions and spread plating at 3 hours and 24 hours. All XLD plates were incubated at 37° C. overnight before enumeration.

Figure 3:
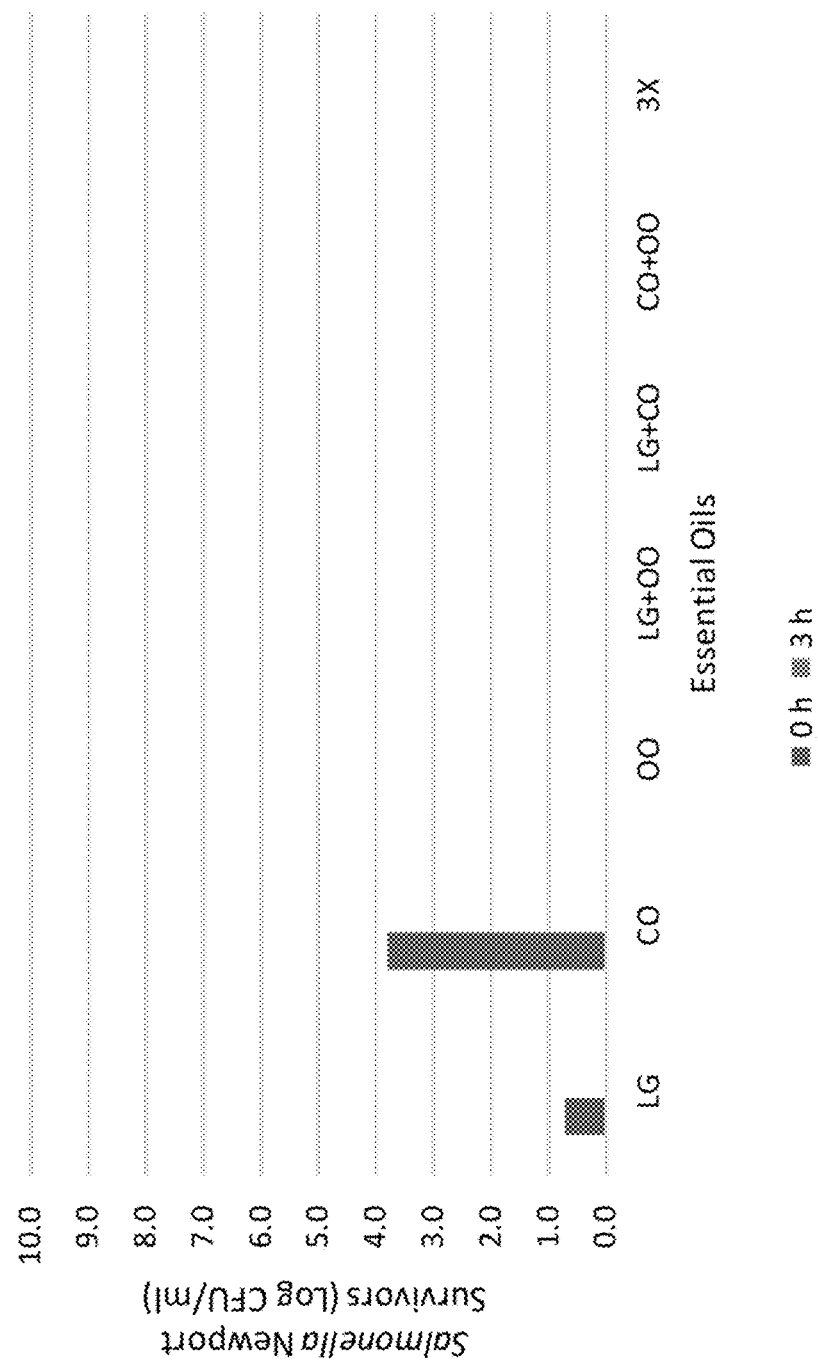
FIG. 3 is a graph showing the effectiveness of individual and combination essential oil treatments at 0.05% concentration. Oregano oil (OO), lemongrass oil (LG), cinnamon oil (CO) and dual and triple (3×) combination treatments were tested.
Figure 4:
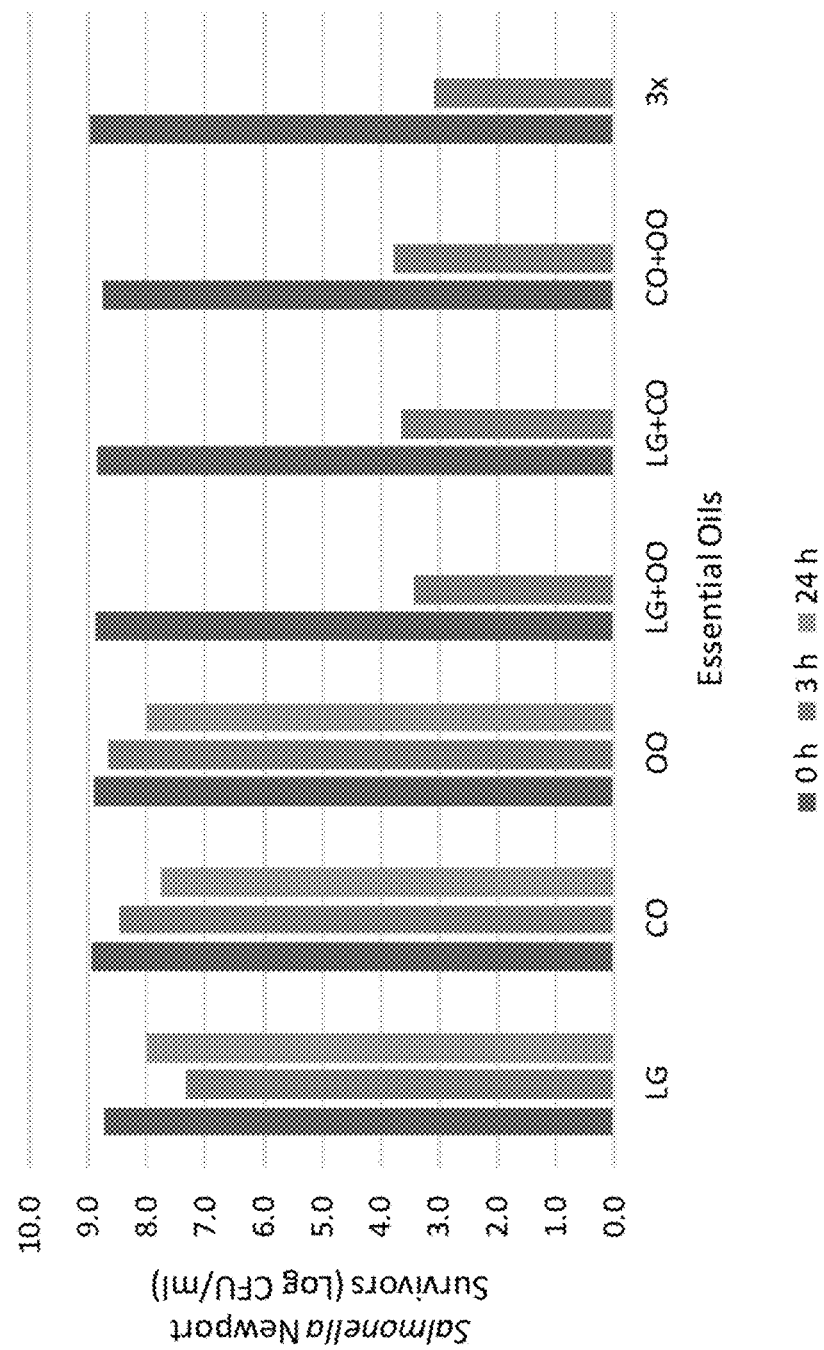
FIG. 4 is a graph showing the effectiveness of individual and combination treatments with LG, CO, OO, and dual and triple combinations at 0.025% concentration.
Figure 5:
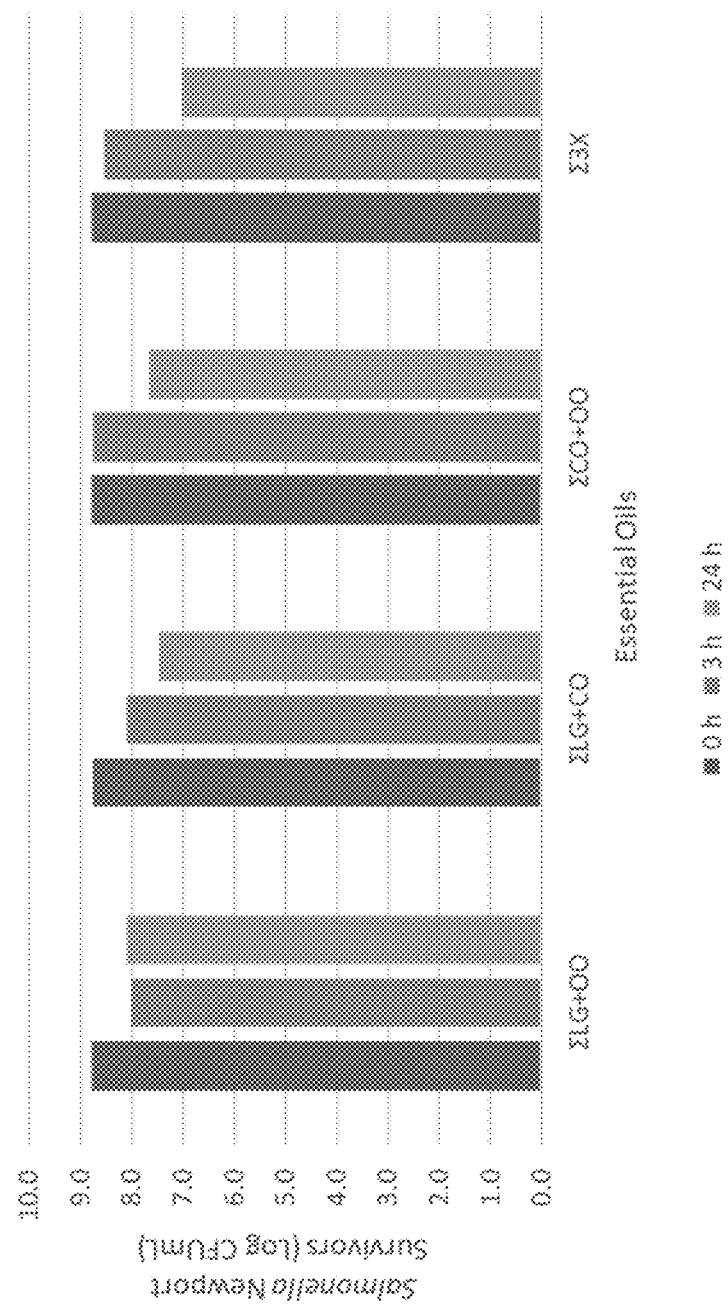
FIG. 5 is a graph showing the efficacy of essential oil combinations giving a final concentration of 0.025%.

Results are depicted in FIGS. 3-5. In earlier studies, plant essential oils and their active components were used at concentrations of 0.1-0.5%. Even though these antimicrobials were very effective against foodborne pathogenic bacteria at these concentrations, the objective of this investigation was to assess the effectiveness and any possible synergies of combinations of plant-based antimicrobials at lower concentrations in vitro against *Salmonella enterica*.

FIG. 3 shows the effectiveness of individual and combination essential oil treatments at 0.05% concentration. No survivors of S. Newport were detected with oregano oil (OO) treatment and all essential oil, dual, and triple, combination treatments immediately upon exposure (0 hour time point) and continued thereafter. Both lemongrass (LG) and cinnamon oil (CO) treatments showed a reduction of >8-logs and >5-logs, respectively, at 0 hours. No survivors were detected at 3 hours for all the treatments.

FIG. 4 shows the effectiveness of individual and combination treatments at 0.025% concentration. At this concentration, the combination treatments were more effective against S. Newport than individual treatments. The triple (3×) combination showed a slightly better reduction at 3 hours than any of the dual essential oil combinations. At 24 hours, no survivors were detected in all the combination treatments (dual and triple).

FIG. 5 shows the efficacy of essential oil combinations giving a final concentration of 0.025%. The effectiveness of treatments in FIG. 5 was reduced in comparison to those depicted in FIG. 4. Essential oils with a final summating concentration of 0.025% showed a reduction of 1-log with ΣLG+OO combination and less than a 2-log reduction with ΣLG+CO, ΣCO+OO and Σ3× combinations at 24 hours.

Example 5

Efficacy of Plant-Based Antimicrobials on Melon Rinds

Melon samples were harvested from farms located in Georgia, Arizona, Texas (2 locations—Weslaco and Uvalde), North Carolina, Indiana, and California. The tested melons included five cantaloupe varieties (F39, Infinite Gold SAKATA, Davinci SAKATA, Cruiser and PRIM), three honeydew varieties (OC164, HD150 and Honeydew 252) and seven cantaloupe hybrids (TH1, TH2, TH3, TH4, TH5, TH6, and TH9).

Melon rinds were cut into pieces of 10 g and inoculated with $10^6$ CFU/mL of S. Newport or *L. monocytogenes* culture. The inoculated samples were dried for 1 hour to let the bacteria attach to the surface. The samples were then immersed in 5% olive extract or 0.5% oregano oil antimicrobial solution and gently agitated for 2 minutes. Phosphate buffered saline (PBS) was used as a control. The samples were tested with three repeats for each experiment. After the treatment, the survivors of S. Newport and *L. monocytogenes* were enumerated at Days 0 and 3. The rind sample was mixed with 90 mL of buffered peptone water (BPW) and stomached for 2 minutes. Serial dilutions were made in 0.1% peptone water and aliquots plated on xylose lysine deoxycholate (XLD) agar and Modified Oxford (MOX) formulation agar for enumeration of S. Newport and *L. monocytogenes*, respectively. The XLD and MOX plates were incubated at 35° C. for 24-48 hours. The colonies were counted and calculated as colonies forming units per gram (CFU/g).

The survival of S. Newport and *L. monocytogenes* are shown in Tables 26-32 and 33-39, respectively. The plant-based antimicrobials reduced S. Newport and *L. monocytogenes* population on all the rind samples, regardless of the melon types, varieties, or growing locations. Compared to the control wash (PBS), the plant-based antimicrobial treatments caused 2-3.6 and 1.6-3.7 log reductions in populations of *Salmonella* and *L. monocytogenes*, respectively. In most cases, the plant-based antimicrobial treatments reduced the pathogen population to below the detection limit (1 CFU/g) at day 3. In general, oregano oil had better antimicrobial activity than olive extract. The antimicrobial treatments were more effective on *Salmonella* than on *L. monocytogenes*. The antimicrobial treatments exhibited better reductions on honeydews than on cantaloupes.

TABLE 26

Survival of *Salmonella* Newport (Log CFU/g) on Georgia grown melon rinds after plant-based antimicrobial treatments

|  | Day 0 | | | Day 3 | | |
| --- | --- | --- | --- | --- | --- | --- |
| Variety | Control (PBS) | 5% olive extract | 0.5% oregano oil | Control (PBS) | 5% olive extract | 0.5% oregano oil |
| F39 | 4.48 ± 0.07* | 2.30 ± 0.18 | 1.84 ± 0.33 | 4.59 ± 0.05 | <1.00** | 1.46 ± 0.56 |
| OC164 | 4.00 ± 0.05 | 1.93 ± 0.16 | 1.06 ± 0.10 | 3.98 ± 0.08 | <1.00 | <1.00 |
| HD150 | 4.28 ± 0.12 | 1.94 ± 0.21 | <1.00 | 4.08 ± 0.10 | <1.00 | <1.00 |
| Infinite Gold SAKATA | 4.36 ± 0.17 | 2.43 ± 0.14 | 1.86 ± 0.33 | 4.29 ± 0.12 | 2.02 ± 0.31 | <1.00 |
| Honeydew 252 | 3.99 ± 0.13 | 1.13 ± 0.23 | <1.00 | 3.64 ± 0.23 | <1.00 | <1.00 |
| Davinci SAKATA | 4.36 ± 0.10 | 2.59 ± 0.11 | 2.67 ± 0.19 | 4.20 ± 0.09 | 2.15 ± 0.24 | 1.79 ± 0.38 |
| Cruiser | 4.64 ± 0.03 | 1.23 ± 0.21 | <1.00 | 4.60 ± 0.04 | 1.06 ± 0.10 | 1.13 ± 0.23 |
| TH1 | 4.59 ± 0.05 | 1.65 ± 0.14 | 1.65 ± 0.20 | 4.34 ± 0.20 | <1.00 | <1.00 |
| TH2 | 4.09 ± 0.06 | <1.00 | 1.90 ± 0.10 | 4.02 ± 0.07 | <1.00 | <1.00 |
| TH3 | 4.03 ± 0.02 | 1.06 ± 0.10 | <1.00 | 4.10 ± 0.13 | <1.00 | <1.00 |
| TH4 | 4.55 ± 0.06 | 1.80 ± 0.12 | 1.16 ± 0.15 | 4.36 ± 0.07 | 1.06 ± 0.10 | <1.00 |
| TH5 | 4.00 ± 0.02 | 1.32 ± 0.15 | <1.00 | 3.86 ± 0.08 | <1.00 | <1.00 |
| TH6 | 4.45 ± 0.13 | 1.06 ± 0.10 | <1.00 | 4.32 ± 0.05 | <1.00 | <1.00 |

Data is shown as mean ± standard deviation. The detection limit for this study was 1 Log CFU/g.

TABLE 27

Survival of *Salmonella* Newport (Log CFU/g) on Arizona grown melon rinds after plant-based antimicrobial treatments

|  | Day 0 | | | Day 3 | | |
| --- | --- | --- | --- | --- | --- | --- |
| Variety | Control (PBS) | 5% olive extract | 0.5% oregano oil | Control (PBS) | 5% olive extract | 0.5% oregano oil |
| F39 | 4.42 ± 0.08* | 2.33 ± 0.41 | 1.93 ± 0.28 | 4.46 ± 0.05 | 1.75 ± 0.27 | <1.00** |
| OC164 | 4.42 ± 0.07 | 2.74 ± 0.18 | 1.90 ± 0.32 | 4.57 ± 0.06 | 1.71 ± 0.28 | 1.13 ± 0.23 |
| HD150 | 4.40 ± 0.06 | 1.10 ± 0.17 | 1.13 ± 0.23 | 4.38 ± 0.12 | <1.00 | 1.10 ± 0.17 |
| Infinite Gold SAKATA | 4.39 ± 0.05 | 1.99 ± 0.41 | 2.21 ± 0.27 | 4.04 ± 0.01 | <1.00 | <1.00 |
| Honeydew 252 | 4.52 ± 0.09 | <1.00 | <1.00 | 4.48 ± 0.08 | <1.00 | <1.00 |
| Davinci SAKATA | 4.42 ± 0.03 | 2.62 ± 0.22 | 2.01 ± 0.41 | 4.36 ± 0.02 | 2.21 ± 0.28 | <1.00 |
| Cruiser | 4.30 ± 0.21 | 2.15 ± 0.43 | 1.33 ± 0.35 | 3.71 ± 0.17 | <1.00 | <1.00 |
| TH1 | 4.03 ± 0.06 | 1.43 ± 0.15 | <1.00 | 3.96 ± 0.04 | <1.00 | <1.00 |
| TH2 | 4.37 ± 0.03 | 2.01 ± 0.10 | 1.59 ± 0.10 | 4.10 ± 0.05 | <1.00 | <1.00 |
| TH4 | 4.32 ± 0.04 | 2.10 ± 0.13 | 1.70 ± 0.13 | 4.09 ± 0.01 | 1.24 ± 0.28 | <1.00 |
| TH6 | 4.19 ± 0.08 | 1.62 ± 0.15 | 1.19 ± 0.20 | 4.04 ± 0.04 | 1.06 ± 0.10 | <1.00 |

Data is shown as mean ± standard deviation. The detection limit for this study was 1 Log CFU/g.

TABLE 28

Survival of *Salmonella* Newport (Log CFU/g) on Weslaco, Texas grown melon rinds after plant-based antimicrobial treatments

|  | Day 0 | | | Day 3 | | |
| --- | --- | --- | --- | --- | --- | --- |
| Variety | Control (PBS) | 5% olive extract | 0.5% oregano oil | Control (PBS) | 5% olive extract | 0.5% oregano oil |
| F39 | 4.35 ± 0.06* | 2.31 ± 0.22 | 1.55 ± 0.33 | 4.47 ± 0.10 | 1.28 ± 0.27 | 1.16 ± 0.28 |
| OC164 | 4.45 ± 0.07 | 1.80 ± 0.31 | 1.10 ± 0.17 | 4.40 ± 0.09 | 1.16 ± 0.28 | <1.00** |
| HD150 | 3.92 ± 0.09 | 1.48 ± 0.26 | 1.06 ± 0.10 | 3.95 ± 0.16 | <1.00 | <1.00 |
| Infinite Gold SAKATA | 4.50 ± 0.00 | 1.88 ± 0.22 | 1.58 ± 0.21 | 4.41 ± 0.08 | 1.41 ± 0.30 | <1.00 |
| Honeydew 252 | 4.08 ± 0.06 | 1.66 ± 0.17 | 1.06 ± 0.10 | 4.22 ± 0.08 | 1.10 ± 0.17 | <1.00 |
| Davinci SAKATA | 4.49 ± 0.02 | 2.39 ± 0.17 | 1.51 ± 0.29 | 4.43 ± 0.06 | 1.35 ± 0.37 | <1.00 |

TABLE 28-continued

Survival of *Salmonella* Newport (Log CFU/g) on Weslaco, Texas grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| Cruiser | 4.47 ± 0.02 | 2.41 ± 0.21 | 2.15 ± 0.43 | 4.44 ± 0.08 | 2.56 ± 0.20 | <1.00 |
| PRIM | 4.00 ± 0.02 | <1.00 | <1.00 | 3.88 ± 0.10 | <1.00 | <1.00 |

Data is shown as mean ± standard deviation. The detection limit for this study was 1 Log CFU/g.

TABLE 29

Survival of *Salmonella* Newport (Log CFU/g) on Uvalde, Texas grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| F39 | 4.46 ± 0.05* | 2.19 ± 0.28 | 1.13 ± 0.23 | 4.47 ± 0.13 | 1.31 ± 0.39 | 1.10 ± 0.17 |
| OC164 | 4.09 ± 0.04 | 1.19 ± 0.20 | <1.00** | 4.05 ± 0.06 | <1.00 | <1.00 |
| HD150 | 4.29 ± 0.08 | 1.95 ± 0.15 | <1.00 | 4.07 ± 0.08 | 1.19 ± 0.20 | <1.00 |
| Infinite Gold SAKATA | 4.52 ± 0.06 | 2.44 ± 0.17 | 2.40 ± 0.19 | 4.28 ± 0.11 | 2.05 ± 0.20 | 1.62 ± 0.22 |
| Honeydew 252 | 4.29 ± 0.13 | 2.13 ± 0.28 | 1.42 ± 0.26 | 4.21 ± 0.08 | 1.94 ± 0.12 | <1.00 |
| Davinci SAKATA | 4.61 ± 0.02 | 2.60 ± 0.16 | 2.11 ± 0.27 | 4.60 ± 0.03 | 1.41 ± 0.37 | <1.00 |
| TH6 | 4.01 ± 0.12 | <1.00 | <1.00 | 3.99 ± 0.04 | <1.00 | <1.00 |
| TH9 | 3.97 ± 0.06 | <1.00 | 1.19 ± 0.20 | 3.94 ± 0.08 | <1.00 | <1.00 |

Data is shown as mean ± standard deviation. The detection limit for this study was 1 Log CFU/g.

TABLE 30

Survival of *Salmonella* Newport (Log CFU/g) on North Carolina grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| F39 | 4.31 ± 0.11* | <1.00** | <1.00 | 4.29 ± 0.11 | <1.00 | <1.00 |
| OC164 | 4.44 ± 0.03 | 1.81 ± 0.27 | 1.16 ± 0.28 | 4.47 ± 0.07 | <1.00 | <1.00 |
| HD150 | 4.53 ± 0.09 | <1.00 | 1.13 ± 0.23 | 4.57 ± 0.03 | <1.00 | <1.00 |
| Infinite Gold SAKATA | 4.42 ± 0.07 | 1.94 ± 0.30 | 1.78 ± 0.33 | 4.33 ± 0.17 | <1.00 | <1.00 |
| Honeydew 252 | 4.07 ± 0.04 | 2.43 ± 0.32 | <1.00 | 4.09 ± 0.01 | <1.00 | <1.00 |
| Davinci SAKATA | 4.63 ± 0.03 | 2.03 ± 0.16 | 1.37 ± 0.19 | 4.57 ± 0.02 | <1.00 | <1.00 |
| TH2 | 4.19 ± 0.13 | <1.00 | <1.00 | 4.22 ± 0.07 | <1.00 | <1.00 |
| TH3 | 4.46 ± 0.05 | 1.66 ± 0.18 | <1.00 | 4.16 ± 0.05 | <1.00 | <1.00 |
| TH4 | 4.33 ± 0.10 | 1.06 ± 0.10 | <1.00 | 4.12 ± 0.09 | <1.00 | <1.00 |
| TH5 | 4.46 ± 0.04 | <1.00 | 1.53 ± 0.12 | 4.17 ± 0.14 | <1.00 | <1.00 |
| TH6 | 4.45 ± 0.07 | 1.06 ± 0.10 | <1.00 | 4.07 ± 0.09 | <1.00 | <1.00 |

Data is shown as mean ± standard deviation. The detection limit for this study was 1 Log CFU/g.

TABLE 31

Survival of *Salmonella* Newport (Log CFU/g) on Indiana grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| F39 | 4.16 ± 0.07* | 1.19 ± 0.20 | <1.00** | 4.02 ± 0.02 | <1.00 | <1.00 |
| OC164 | 4.07 ± 0.08 | <1.00 | <1.00 | 4.00 ± 0.05 | <1.00 | <1.00 |
| HD150 | 4.46 ± 0.05 | 1.06 ± 0.10 | <1.00 | 4.41 ± 0.10 | <1.00 | <1.00 |
| Infinite Gold SAKATA | 4.29 ± 0.09 | 1.41 ± 0.12 | 1.10 ± 0.17 | 4.07 ± 0.09 | <1.00 | <1.00 |
| Honeydew 252 | 4.44 ± 0.02 | <1.00 | <1.00 | 4.29 ± 0.14 | <1.00 | <1.00 |
| Davinci SAKATA | 4.10 ± 0.06 | 1.86 ± 0.16 | 1.06 ± 0.10 | 3.98 ± 0.03 | <1.00 | <1.00 |

Data is shown as mean ± standard deviation. The detection limit for this study was 1 Log CFU/g.

TABLE 32

Survival of *Salmonella* Newport (Log CFU/g) on California grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| TH1 | 4.08 ± 0.11* | 1.51 ± 0.22 | <1.00** | 3.94 ± 0.02 | <1.00 | <1.00 |
| TH2 | 3.99 ± 0.03 | 1.06 ± 0.10 | <1.00 | 3.93 ± 0.03 | <1.00 | <1.00 |
| TH3 | 4.38 ± 0.05 | 1.12 ± 0.10 | <1.00 | 4.06 ± 0.05 | <1.00 | <1.00 |
| TH4 | 4.31 ± 0.09 | 1.85 ± 0.11 | 1.85 ± 0.05 | 4.09 ± 0.10 | 1.06 ± 0.10 | <1.00 |
| TH5 | 4.51 ± 0.05 | 1.19 ± 0.20 | 1.32 ± 0.15 | 4.51 ± 0.05 | <1.00 | <1.00 |
| TH6 | 4.47 ± 0.04 | <1.00 | 1.06 ± 0.10 | 4.31 ± 0.08 | <1.00 | <1.00 |

Data is shown as mean ± standard deviation. The detection limit for this study was 1 Log CFU/g.

TABLE 33

Survival of *Listeria monocytogenes* (Log CFU/g) on Georgia grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| F39 | 4.62 ± 0.06* | 2.20 ± 0.08 | 2.58 ± 0.17 | 4.58 ± 0.02 | 2.42 ± 0.17 | 2.63 ± 0.17 |
| OC164 | 4.30 ± 0.14 | 2.22 ± 0.27 | 2.43 ± 0.18 | 4.54 ± 0.15 | 1.65 ± 0.24 | 2.67 ± 0.12 |
| HD150 | 4.04 ± 0.03 | 2.64 ± 0.09 | 1.45 ± 0.44 | 4.04 ± 0.33 | 2.75 ± 0.07 | 1.53 ± 0.46 |
| Infinite Gold SAKATA | 4.74 ± 0.02 | 3.26 ± 0.04 | 3.42 ± 0.08 | 4.79 ± 0.09 | 3.09 ± 0.14 | 3.10 ± 0.18 |
| Honeydew 252 | 3.50 ± 0.25 | 2.24 ± 0.13 | 1.18 ± 0.31 | 2.65 ± 0.30 | 2.07 ± 0.23 | <1.00** |
| Davinci SAKATA | 4.47 ± 0.09 | 2.91 ± 0.03 | 2.95 ± 0.21 | 4.53 ± 0.03 | 2.89 ± 0.12 | 2.79 ± 0.27 |
| Cruiser | 4.69 ± 0.03 | 2.35 ± 0.19 | 2.44 ± 0.30 | 4.61 ± 0.10 | 2.57 ± 0.03 | 2.94 ± 0.10 |
| TH1 | 4.54 ± 0.11 | 1.72 ± 0.23 | 2.41 ± 0.19 | 4.91 ± 0.06 | <1.00 | <1.00 |
| TH2 | 4.57 ± 0.11 | 1.37 ± 0.41 | 2.69 ± 0.22 | 5.24 ± 0.06 | 1.92 ± 0.09 | 2.08 ± 0.21 |
| TH3 | 4.45 ± 0.08 | 2.22 ± 0.15 | 2.10 ± 0.32 | 5.03 ± 0.12 | 1.10 ± 0.17 | 1.59 ± 0.19 |
| TH4 | 4.72 ± 0.07 | 2.42 ± 0.03 | 2.79 ± 0.15 | 5.21 ± 0.13 | <1.00 | 1.51 ± 0.20 |
| TH5 | 4.60 ± 0.09 | 2.83 ± 0.13 | 2.98 ± 0.10 | 4.79 ± 0.02 | <1.00 | <1.00 |
| TH6 | 4.52 ± 0.11 | 2.58 ± 0.04 | 2.52 ± 0.15 | 4.61 ± 0.04 | 1.32 ± 0.15 | 1.43 ± 0.38 |

Data is shown as mean ± standard deviation. The detection limit for this study was 1 Log CFU/g.

TABLE 34

Survival of *Listeria monocytogenes* (Log CFU/g) on Arizona grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| F39 | 4.86 ± 0.02* | 3.38 ± 0.31 | 3.23 ± 0.16 | 4.91 ± 0.03 | 2.55 ± 0.07 | 1.57 ± 0.26 |
| OC164 | 4.83 ± 0.07 | 2.65 ± 0.32 | 2.79 ± 0.20 | 4.94 ± 0.06 | 1.81 ± 0.23 | 1.84 ± 0.18 |
| HD150 | 4.85 ± 0.12 | 1.06 ± 0.10 | 2.15 ± 0.25 | 4.96 ± 0.19 | 1.18 ± 0.31 | 1.44 ± 0.28 |
| Infinite Gold SAKATA | 4.69 ± 0.05 | 3.25 ± 0.21 | 3.24 ± 0.14 | 4.80 ± 0.05 | 3.00 ± 0.06 | 2.32 ± 0.39 |
| Honeydew 252 | 4.69 ± 0.05 | 1.22 ± 0.38 | <1.00** | 4.70 ± 0.10 | <1.00 | <1.00 |
| Davinci SAKATA | 4.49 ± 0.07 | 2.78 ± 0.12 | 2.58 ± 0.16 | 4.44 ± 0.10 | 2.51 ± 0.23 | 2.44 ± 0.21 |
| TH1 | 4.48 ± 0.06 | 2.13 ± 0.23 | 2.57 ± 0.17 | 4.84 ± 0.09 | 1.32 ± 0.15 | 1.69 ± 0.11 |
| TH2 | 4.61 ± 0.09 | 2.70 ± 0.10 | 2.46 ± 0.09 | 4.93 ± 0.08 | 1.67 ± 0.12 | <1.00 |
| TH4 | 4.73 ± 0.07 | 2.72 ± 0.09 | 2.85 ± 0.11 | 5.04 ± 0.04 | 1.98 ± 0.25 | <1.00 |
| TH6 | 4.42 ± 0.08 | 2.46 ± 0.10 | 2.60 ± 0.17 | 4.89 ± 0.02 | <1.00 | 1.24 ± 0.28 |

Data is shown as mean ± standard deviation. The detection limit for this study was 1 Log CFU/g.

TABLE 35

Survival of *Listeria monocytogenes* (Log CFU/g) on Weslaco, Texas grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| F39 | 4.28 ± 0.27* | 2.84 ± 0.14 | 2.65 ± 0.18 | 4.40 ± 0.08 | 2.34 ± 0.20 | 2.18 ± 0.27 |
| OC164 | 4.37 ± 0.33 | 1.54 ± 0.18 | 2.46 ± 0.22 | 4.58 ± 0.08 | 2.59 ± 0.25 | 1.10 ± 0.17 |
| HD150 | 4.28 ± 0.07 | 2.63 ± 0.23 | 2.39 ± 0.35 | 4.58 ± 0.09 | 1.82 ± 0.19 | <1.00** |
| Infinite Gold SAKATA | 4.21 ± 0.10 | 2.14 ± 0.11 | 2.13 ± 0.26 | 4.25 ± 0.11 | 1.90 ± 0.27 | 2.03 ± 0.13 |
| Honeydew 252 | 4.32 ± 0.12 | 2.83 ± 0.16 | 1.20 ± 0.35 | 4.10 ± 0.22 | 2.08 ± 0.28 | 1.16 ± 0.28 |
| Davinci SAKATA | 4.73 ± 0.05 | 3.13 ± 0.20 | 3.18 ± 0.36 | 4.87 ± 0.12 | 2.01 ± 0.22 | 2.23 ± 0.40 |
| Cruiser | 4.66 ± 0.04 | 2.71 ± 0.23 | 3.06 ± 0.21 | 4.60 ± 0.11 | 2.16 ± 0.28 | 1.74 ± 0.18 |
| PRIM | 4.73 ± 0.13 | 2.02 ± 0.19 | 2.23 ± 0.29 | 4.86 ± 0.13 | 1.42 ± 0.21 | 2.12 ± 0.24 |

Data is shown as mean ± standard deviation. The detection limit for this study was 1 Log CFU/g.

TABLE 36

Survival of *Listeria monocytogenes* (Log CFU/g) on Uvalde, Texas grown melon rinds after plant-based antimicrobial treatments

| | Day 0 | | | Day 3 | | |
|---|---|---|---|---|---|---|
| Variety | Control (PBS) | 5% olive extract | 0.5% oregano oil | Control (PBS) | 5% olive extract | 0.5% oregano oil |
| F39 | 4.61 ± 0.07* | 2.86 ± 0.11 | 3.07 ± 0.24 | 4.40 ± 0.26 | 2.88 ± 0.19 | 2.66 ± 0.28 |
| OC164 | 3.99 ± 0.02 | 1.13 ± 0.23 | 1.99 ± 0.28 | 4.06 ± 0.05 | <1.00** | 1.06 ± 0.10 |
| HD150 | 3.97 ± 0.02 | 1.61 ± 0.24 | 2.13 ± 0.22 | 4.04 ± 0.11 | 1.31 ± 0.28 | 1.20 ± 0.35 |
| Infinite Gold SAKATA | 4.48 ± 0.11 | 2.55 ± 0.16 | 2.71 ± 0.19 | 4.55 ± 0.06 | 2.67 ± 0.15 | 1.80 ± 0.24 |
| Honeydew 252 | 4.31 ± 0.28 | 1.28 ± 0.34 | 1.10 ± 0.17 | 4.52 ± 0.14 | <1.00 | <1.00 |
| Davinci SAKATA | 4.62 ± 0.06 | 3.03 ± 0.13 | 3.48 ± 0.03 | 4.60 ± 0.02 | 3.15 ± 0.08 | 2.74 ± 0.22 |
| TH6 | 4.14 ± 0.14 | <1.00 | 1.06 ± 0.10 | 4.38 ± 0.13 | <1.00 | 1.06 ± 0.10 |
| TH9 | 3.86 ± 0.11 | 1.58 ± 0.17 | 2.17 ± 0.23 | 4.18 ± 0.09 | 1.06 ± 0.10 | <1.00 |

Data is shown as mean ± standard deviation. The detection limit for this study was 1 Log CFU/g.

TABLE 37

Survival of *Listeria monocytogenes* (Log CFU/g) on North Carolina grown melon rinds after plant-based antimicrobial treatments

| Variety | Day 0 | | | Day 3 | | |
|---|---|---|---|---|---|---|
| | Control (PBS) | 5% olive extract | 0.5% oregano oil | Control (PBS) | 5% olive extract | 0.5% oregano oil |
| F39 | 4.73 ± 0.03* | 1.63 ± 0.22 | 2.18 ± 0.18 | 4.78 ± 0.10 | <1.00** | <1.00 |
| OC164 | 4.42 ± 0.29 | 2.31 ± 0.26 | 1.38 ± 0.37 | 4.25 ± 0.23 | <1.00 | <1.00 |
| HD150 | 4.19 ± 0.19 | 1.45 ± 0.37 | 1.18 ± 0.31 | 4.19 ± 0.23 | <1.00 | 1.06 ± 0.10 |
| Infinite Gold SAKATA | 4.46 ± 0.05 | 2.28 ± 0.26 | 2.34 ± 0.16 | 4.05 ± 0.11 | <1.00 | 1.10 ± 0.17 |
| Honeydew 252 | 4.04 ± 0.08 | 1.20 ± 0.35 | 1.13 ± 0.23 | 4.30 ± 0.22 | <1.00 | <1.00 |
| Davinci SAKATA | 4.72 ± 0.05 | 3.13 ± 0.10 | 3.12 ± 0.21 | 4.82 ± 0.14 | 2.85 ± 0.24 | 2.90 ± 0.43 |
| TH2 | 4.55 ± 0.05 | 1.44 ± 0.24 | 2.23 ± 0.20 | 4.75 ± 0.09 | <1.00 | <1.00 |
| TH3 | 4.43 ± 0.04 | 1.94 ± 0.25 | 2.07 ± 0.18 | 4.69 ± 0.08 | <1.00 | <1.00 |
| TH4 | 4.25 ± 0.19 | 1.06 ± 0.10 | 1.98 ± 0.14 | 4.78 ± 0.14 | 1.06 ± 0.10 | <1.00 |
| TH5 | 4.42 ± 0.12 | 1.88 ± 0.19 | 2.34 ± 0.16 | 4.53 ± 0.09 | 1.06 ± 0.10 | 1.41 ± 0.12 |
| TH6 | 4.41 ± 0.02 | 1.35 ± 0.16 | 1.23 ± 0.21 | 4.52 ± 0.11 | <1.00 | 1.06 ± 0.10 |

Data is shown as mean ± standard deviation. The detection limit for this study was 1 Log CFU/g.

TABLE 38

Survival of *Listeria monocytogenes* (Log CFU/g) on Indiana grown melon rinds after plant-based antimicrobial treatments

| Variety | Day 0 | | | Day 3 | | |
|---|---|---|---|---|---|---|
| | Control (PBS) | 5% olive extract | 0.5% oregano oil | Control (PBS) | 5% olive extract | 0.5% oregano oil |
| F39 | 4.72 ± 0.07* | 2.25 ± 0.08 | 2.18 ± 0.14 | 4.98 ± 0.05 | 1.90 ± 0.10 | <1.00** |
| OC164 | 4.52 ± 0.17 | 1.89 ± 0.77 | 1.06 ± 0.10 | 4.84 ± 0.12 | <1.00 | <1.00 |
| HD150 | 4.06 ± 0.06 | 1.58 ± 0.17 | 1.16 ± 0.15 | 4.83 ± 0.07 | <1.00 | <1.00 |
| Infinite Gold SAKATA | 4.88 ± 0.08 | 2.68 ± 0.08 | 2.51 ± 0.07 | 4.85 ± 0.08 | 2.11 ± 0.12 | <1.00 |
| Honeydew 252 | 4.44 ± 0.07 | 1.16 ± 0.15 | <1.00 | 4.70 ± 0.13 | <1.00 | <1.00 |
| Davinci SAKATA | 4.76 ± 0.06 | 2.86 ± 0.07 | 1.94 ± 0.15 | 4.93 ± 0.06 | 1.78 ± 0.11 | <1.00 |

Data is shown as mean ± standard deviation. The detection limit for this study was 1 Log CFU/g.

TABLE 39

Survival of *Listeria monocytogenes* (Log CFU/g) on California grown melon rinds after plant-based antimicrobial treatments

| Variety | Day 0 | | | Day 3 | | |
|---|---|---|---|---|---|---|
| | Control (PBS) | 5% olive extract | 0.5% oregano oil | Control (PBS) | 5% olive extract | 0.5% oregano oil |
| TH1 | 4.14 ± 0.08* | 1.90 ± 0.16 | 1.82 ± 0.13 | 4.27 ± 0.06 | 1.54 ± 0.18 | <1.00** |
| TH2 | 4.52 ± 0.09 | 1.96 ± 0.17 | 2.24 ± 0.20 | 4.42 ± 0.08 | 1.57 ± 0.15 | <1.00 |
| TH3 | 4.75 ± 0.10 | 2.21 ± 0.19 | 2.09 ± 0.16 | 4.99 ± 0.07 | <1.00 | <1.00 |
| TH4 | 4.42 ± 0.03 | 1.86 ± 0.20 | 2.31 ± 0.16 | 4.62 ± 0.11 | <1.00 | <1.00 |
| TH5 | 4.59 ± 0.04 | 2.55 ± 0.07 | 2.44 ± 0.04 | 4.76 ± 0.02 | 2.03 ± 0.19 | <1.00 |
| TH6 | 4.60 ± 0.07 | 1.48 ± 0.18 | 1.35 ± 0.16 | 4.55 ± 0.07 | 1.06 ± 0.10 | <1.00 |

Data is shown as mean ± standard deviation. The detection limit for this study was 1 Log CFU/g.

In view of the many possible embodiments to which the principles of the disclosure may be applied, it should be recognized that the illustrated embodiments are only examples and should not be taken as limiting the scope of the invention. Rather, the scope of the invention is defined by the following claims. We therefore claim as our invention all that comes within the scope and spirit of these claims.

We claim:

1. An antimicrobial composition comprising:
   one or more plant-derived compounds; and
   an emulsifier,
   wherein the one or more plant-derived compounds is present in the composition at a concentration of about 0.01-1% (v/v) and wherein the emulsifier is present in the composition at a concentration of about 0.0001-0.1% (v/v).

2. The antimicrobial composition of claim 1, further comprising ozone, one or more plant essential oils, or a combination thereof.

3. The antimicrobial composition of claim 1, wherein:
the one or more plant-derived compounds is carvacrol, eugenol, citral, cinnamaldehyde, or a combination of two or more thereof.

4. The antimicrobial composition of claim 1, wherein the emulsifier is saponin.

5. The composition of claim 1, wherein the composition is present in a food item.

6. A method of killing a microorganism, comprising contacting the microorganism with the antimicrobial composition of claim 1.

7. An antimicrobial composition comprising one or more plant extracts, wherein the one or more plant extracts is present in the composition at a concentration of about 1-10% (v/v) and wherein the one or more plant extracts is olive extract, apple extract, grapeseed extract, potato peel extract, melon peel extract, apple peel extract, orange peel extract, green tea, black tea, or decaffeinated black tea extract, mushroom extract, rice hull smoke extract, or a combination of two or more thereof.

8. The antimicrobial composition of claim 7, further comprising ozone, an emulsifier, one or more plant essential oils, or a combination of two or more thereof.

9. The antimicrobial composition of claim 7, wherein the one or more plant extracts is olive extract, apple extract, grapeseed extract, or a combination of two or more thereof.

10. The composition of claim 7, wherein the composition is present in a food item.

11. A method of killing a microorganism, comprising contacting the microorganism with the antimicrobial composition of claim 7.

12. The method of claim 11, wherein the antimicrobial composition is in solution, a powder, a vapor phase, a fog state, or an edible film.

13. The method of claim 7, wherein the microorganism is a bacterium, bacterial spore, helminth, protozoan, fungus, fungal spore, or virus.

14. The method of claim 7, wherein the bacterium is *Streptococcus, Salmonella enterica, Escherichia coli, Listeria monocytogenes, Staphylococcus aureus, Clostridium perfringens, Clostridium botulinum, Bacillus cereus, Vibrio parahaemolyticus, Vibrio cholerae, Vibrio vulnificus, Campylobacter, Shigella*, or Shiga toxin-producing *E. coli*.

15. The method of claim 7, wherein the microorganism is present in the form of a biofilm.

16. The method of claim 7, wherein the microorganism is present on a food item, a food contact surface, or a non-food contact surface.

17. The method of claim 7, wherein the antimicrobial composition is used 1 to 5 times.

* * * * *